(12) United States Patent
Kim et al.

(10) Patent No.: US 12,035,761 B2
(45) Date of Patent: Jul. 16, 2024

(54) SMART GARMENT, USER TERMINAL, SYSTEM INCLUDING SAME, AND METHOD OF CHANGING DESIGN OF SMART GARMENT

(71) Applicant: Samsung Electronics Co., Ltd., Suwon-si (KR)

(72) Inventors: Kyong Il Kim, Seoul (KR); Hyung Rae Cho, Seoul (KR); Dong Hyun Sohn, Hwaseong-si (KR); In Oh Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/498,498

(22) Filed: Oct. 11, 2021

(65) Prior Publication Data

US 2022/0026769 A1 Jan. 27, 2022

Related U.S. Application Data

(63) Continuation of application No. 15/765,484, filed as application No. PCT/KR2016/003403 on Apr. 1, 2016, now Pat. No. 11,140,926.

(30) Foreign Application Priority Data

Oct. 2, 2015 (KR) .................. 10-2015-0139231

(51) Int. Cl.
*A41D 1/00* (2018.01)
*A41D 15/00* (2006.01)
(Continued)

(52) U.S. Cl.
CPC ............. *A41D 1/002* (2013.01); *A41D 15/00* (2013.01); *D03D 1/0088* (2013.01); *D03D 15/54* (2021.01);
(Continued)

(58) Field of Classification Search
CPC .. A41D 1/002; A41D 31/0005; A41D 27/085; D01D 1/0088; D01D 15/54; D01D 15/547; D10B 2401/18
See application file for complete search history.

(56) References Cited

U.S. PATENT DOCUMENTS 5,150,234 A * 9/1992 Takahashi ................. G02F 1/29
349/1
8,856,996 B2 10/2014 Lee et al.
(Continued)

FOREIGN PATENT DOCUMENTS

EP 2477166 A1 7/2012
JP 2003041420 A 2/2003
(Continued)

OTHER PUBLICATIONS

Kim, Dae Kyom et al. "Liquid Crystal Functionalization of Electrospun Polymer Fibers." Journal of Polymer Science, Part B: Polymer Physics. 51 (2013): 855-867. (Year: 2013).*
(Continued)

*Primary Examiner* — Jenna N Chandhok

(57) ABSTRACT

The disclosed embodiments provide a smart garment on which implemented designs can be changed in terms of color, image, text, etc. Also, a system is provided that comprises: a server for providing various designs to be implemented on a smart garment; and a user terminal that can change the design of the smart garment by receiving various designs from the server and transmitting same to the smart garment. The system according to the disclosed embodiments comprises: a server including a design database for a smart garment; a user terminal for downloading a design for the smart garment from the server; and the smart garment on which the design transmitted from the user terminal is implemented.

4 Claims, 39 Drawing Sheets

(51) Int. Cl.
| | |
|---|---|
| *A41D 27/08* | (2006.01) |
| *A41D 31/00* | (2019.01) |
| *D03D 1/00* | (2006.01) |
| *D03D 15/54* | (2021.01) |
| *D03D 15/547* | (2021.01) |
| *D03D 15/60* | (2021.01) |
| *D03D 15/67* | (2021.01) |
| *G06F 3/04842* | (2022.01) |
| *G06Q 30/06* | (2023.01) |
| *G06Q 50/04* | (2012.01) |
| *G09G 5/00* | (2006.01) |
| *H04L 67/12* | (2022.01) |
| *H04N 5/44* | (2011.01) |
| *H04N 21/422* | (2011.01) |

(52) U.S. Cl.
CPC .......... *D03D 15/547* (2021.01); *D03D 15/60* (2021.01); *D03D 15/67* (2021.01); *G06F 3/04842* (2013.01); *G06Q 30/06* (2013.01); *G06Q 50/04* (2013.01); *G09G 5/003* (2013.01); *G09G 5/006* (2013.01); *H04L 67/12* (2013.01); *H04N 5/44* (2013.01); *H04N 21/42204* (2013.01); *A41D 27/08* (2013.01); *A41D 31/0005* (2013.01); *D10B 2401/18* (2013.01); *G09G 2320/041* (2013.01); *G09G 2360/144* (2013.01)

(56) References Cited

U.S. PATENT DOCUMENTS

| | | | |
|---|---|---|---|
| 2003/0090598 | A1 | 5/2003 | Johngren et al. |
| 2005/0289018 | A1 | 12/2005 | Sullivan et al. |
| 2007/0250591 | A1 | 10/2007 | Milic-Frayling et al. |
| 2009/0174325 | A1 | 7/2009 | Van Bruggen et al. |
| 2009/0310290 | A1 | 12/2009 | Tennent |
| 2010/0151996 | A1 | 6/2010 | Alten et al. |
| 2010/0190440 | A1 | 7/2010 | Kim |
| 2011/0063103 | A1 | 3/2011 | Lee et al. |
| 2011/0068493 | A1 | 3/2011 | Buyuktanir et al. |
| 2011/0317240 | A1 | 12/2011 | Sotzing et al. |
| 2014/0108148 | A1 | 4/2014 | Paul et al. |
| 2014/0282137 | A1 | 9/2014 | Lin et al. |
| 2017/0060485 | A1 | 3/2017 | Krilivsky |
| 2018/0240396 | A1* | 8/2018 | Fontecchio ............ D04B 21/14 |

FOREIGN PATENT DOCUMENTS

| | | | |
|---|---|---|---|
| JP | 2003113508 A | 4/2003 | |
| JP | 2003-280049 A | 10/2003 | |
| JP | 2008041035 A | 2/2008 | |
| JP | 2012039282 A | 2/2012 | |
| KR | 10-2008-0032585 A | 4/2008 | |
| KR | 10-2009-0046241 A | 5/2009 | |
| KR | 10-2009-0055133 A | 6/2009 | |
| KR | 10-2010-0041406 A | 4/2010 | |
| KR | 10-1142192 B1 | 5/2012 | |
| KR | 10-2013-0136205 A | 12/2013 | |
| KR | 10-2015-0106473 A | 9/2015 | |
| WO | 2012/060524 A1 | 5/2012 | |
| WO | 2014/047185 A2 | 3/2014 | |

OTHER PUBLICATIONS

Machine Translation of WO2012060524 (Year: 2012).*
International Search Report dated Jul. 20, 2016 in connection with International Patent Application No. PCT/KR2016/003403.
Written Opinion of the International Searching Authority dated Jul. 20, 2016 in connection with International Patent Application No. PCT/KR2016/003403.
Extended European Search Report regarding Application No. 16851959.3, dated May 4, 2018, 6 pages.
Notice of Reasons for Refusal dated Dec. 2, 2019 in connection with Japanese Patent Application No. 2018-516435, 11 pages.
Communication pursuant to Article 94(3) EPC dated Nov. 5, 2019 in connection with European Patent Application No. 16 851 959.3, 6 pages.
Decision on Refusal in connection with Japanese Application No. 2018-516435 dated Jul. 28, 2020, 10 pages.
Brief Communication dated Feb. 8, 2021 in connection with European Patent Application No. 16851959.3, 6 pages.
Decision to refuse a European Patent Application dated Mar. 12, 2021 in connection with European Patent Application No. 16851959.3, 13 pages.
Provision of the minutes in accordance with Rule 124(4) EPC dated Mar. 9, 2021 in connection with European Patent Application No. 16851959.3, 14 pages.
Examination Report dated Jun. 18, 2021 in connection with Australian Patent Application No. 2016329815, 3 pages.
Office Action dated Jun. 3, 2021 in connection with Chinese Patent Application No. 201680057459.2, 19 pages.
IP Australia, "Examination report No. 2 for standard patent application" dated Oct. 18, 2021, in connection with Australian Patent Application No. 2016329815, 5 pages.
IP Australia, "Examination report No. 3 for standard patent application" dated Jan. 6, 2022, in connection with Australian Patent Application No. 2016329815, 5 pages.
European Patent Office, "European Search Report" dated Dec. 2, 2021, in connection with European Patent Application No. 21175526.9, 8 pages.
Li et al. "Red, Green, Blue (RGB) Electrochromic Fibers for the New Smart Color Change Fabrics" ACS Applied Materials & Interfaces—Research Article, Jul. 24, 2014, 9 pages.
Rejection Decision dated May 7, 2022, in connection with Chinese Application No. 201680057459.2, 16 pages.
Office Action dated Jun. 10, 2022, in connection with Canadian Application No. 2,998,701, 4 pages.
The Second Office Action dated Jan. 6, 2022, in connection with Chinese Application No. 201680057459.2, 18 pages.
Notice of Preliminary Rejection dated Oct. 28, 2022, in connection with Korean Application No. 10-2015-0139231, 12 pages.
Examination report No. 1 for standard patent application dated May 9, 2023, in connection with Australian Application No. 2022201463, 3 pages.
Office Action dated Feb. 8, 2023, in connection with Canadian Application No. 2,998,701, 5 pages.
Notice of Patent Allowance dated Mar. 31, 2023, in connection with Korean Application No. 10-2015-0139231, 3 pages.
Communication pursuant to Article 94(3) EPC dated Aug. 29, 2023, in connection with European Application No. 22156659.9, 6 pages.
Notice of Requesting Submission of Opinion dated Aug. 22, 2023, in connection with Korean Application No. 10-2019-0026466, 24 pages.
Notice of Patent Allowance dated Oct. 30, 2023, in connection with Korean Application No. 10-2019-0026466, 3 pages.
Examination report No. 2 for standard patent application dated Aug. 23, 2023, in connection with Australian Application No. 2022201463, 3 pages.
Notice of acceptance for patent application dated Nov. 9, 2023, in connection with Australian Application No. 2022201463, 3 pages.

* cited by examiner

[Fig. 1]
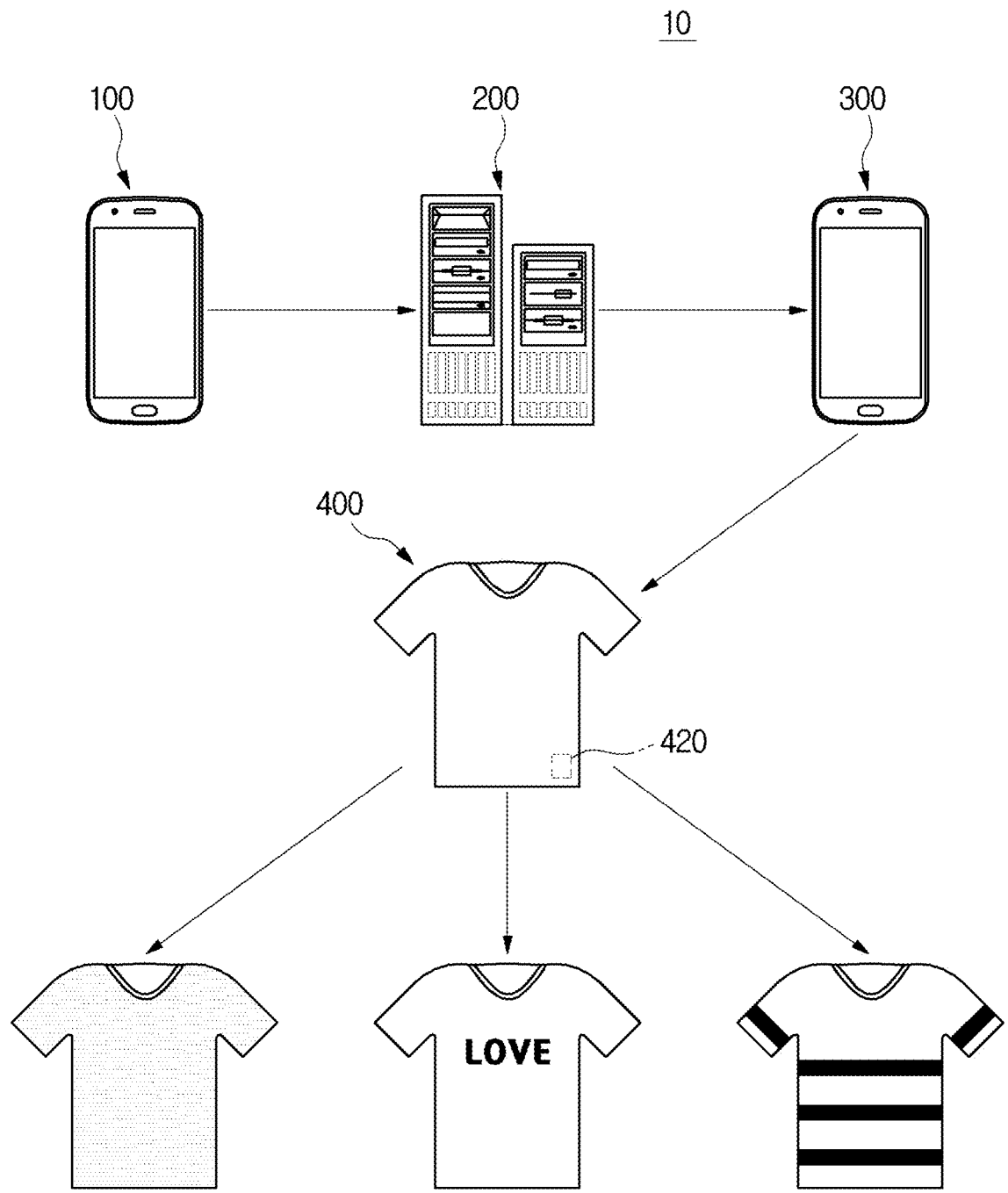

[Fig. 2]
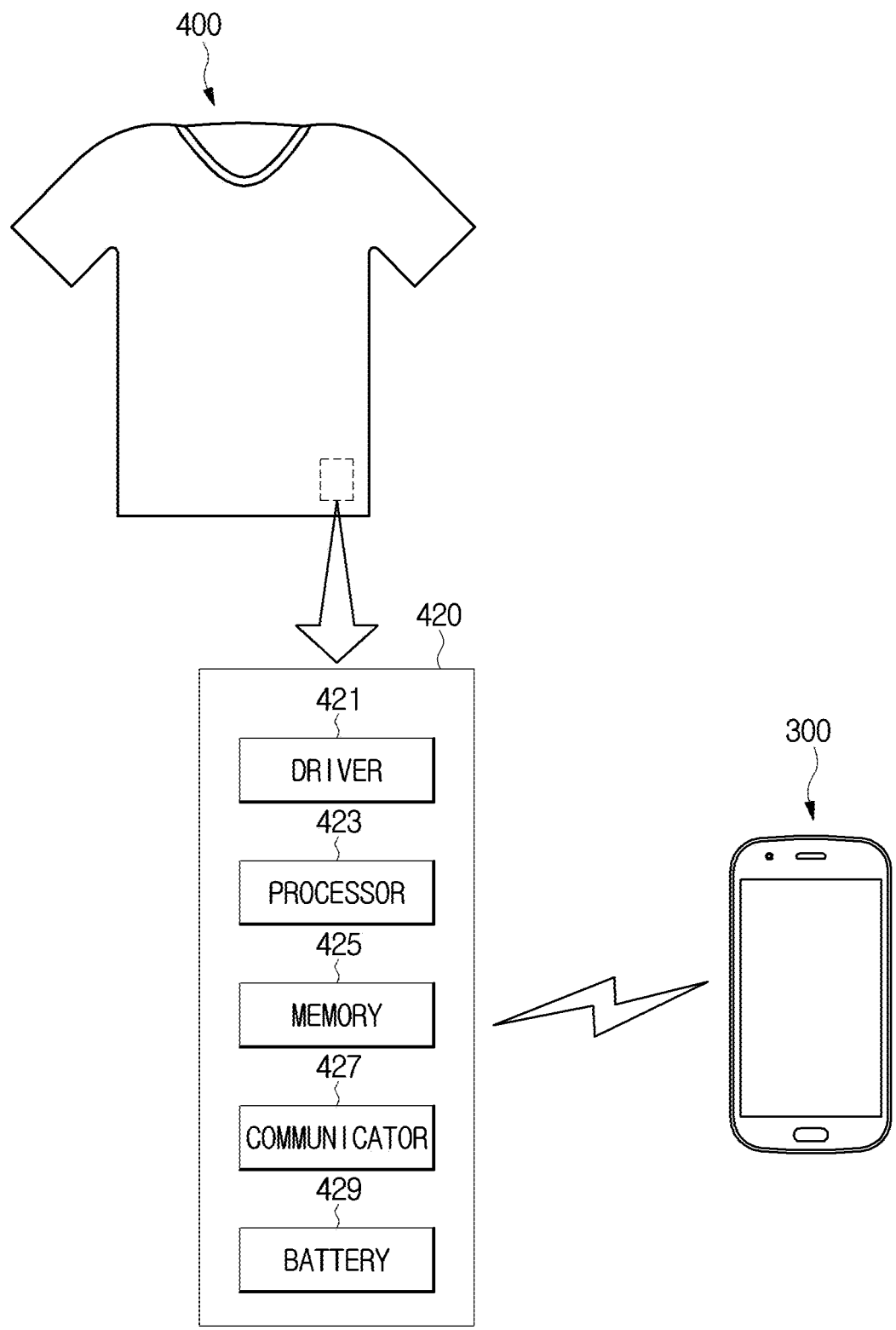

[Fig. 3]
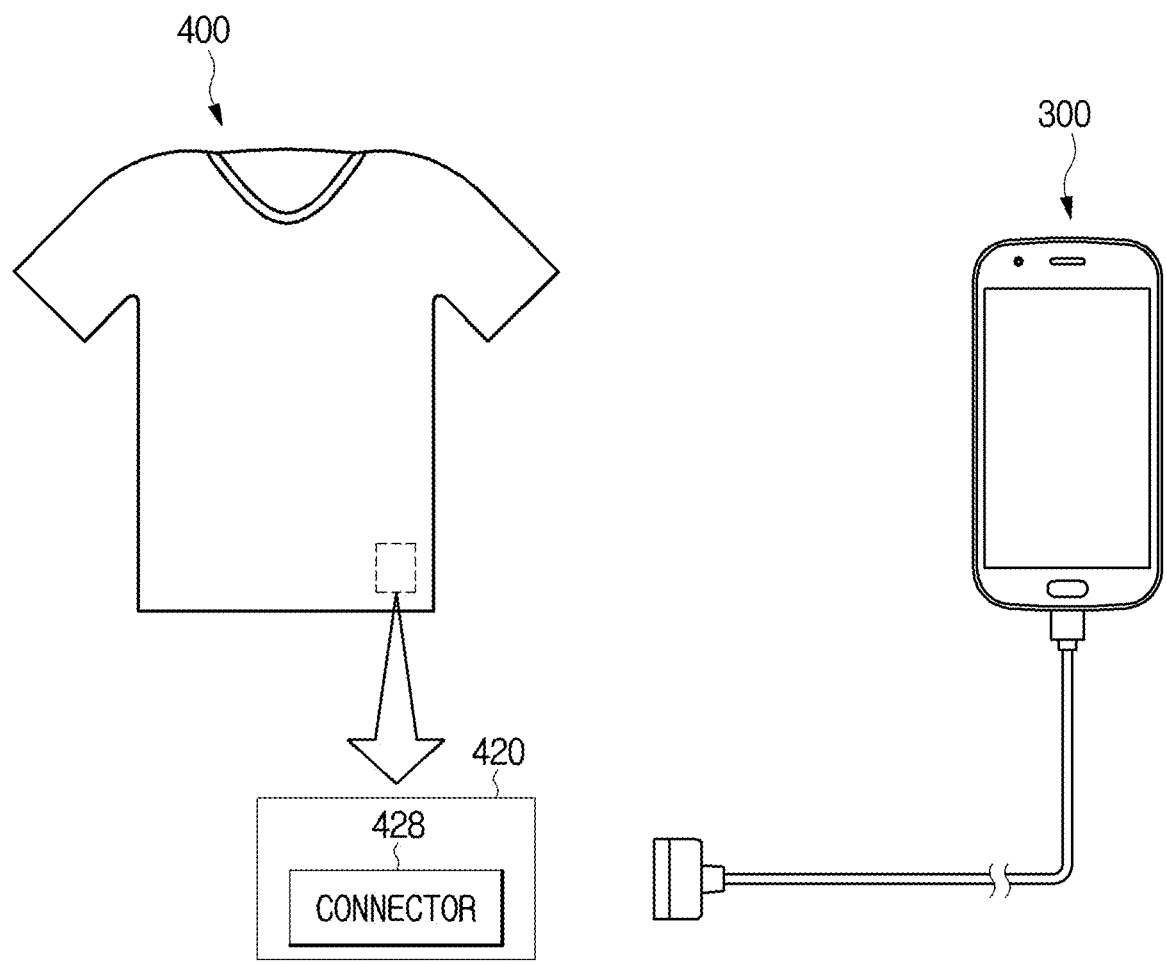

[Fig. 4]
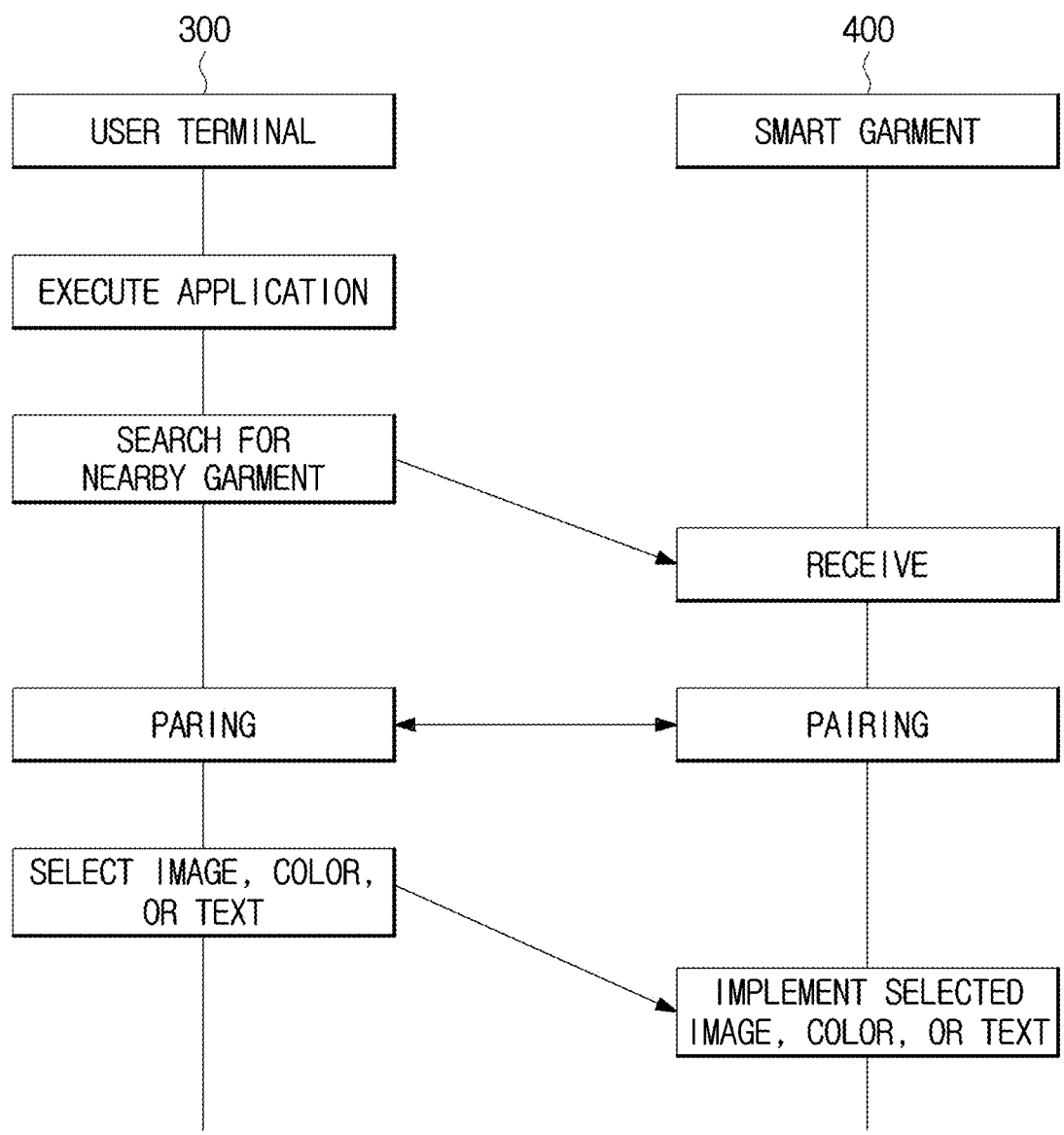

[Fig. 5]
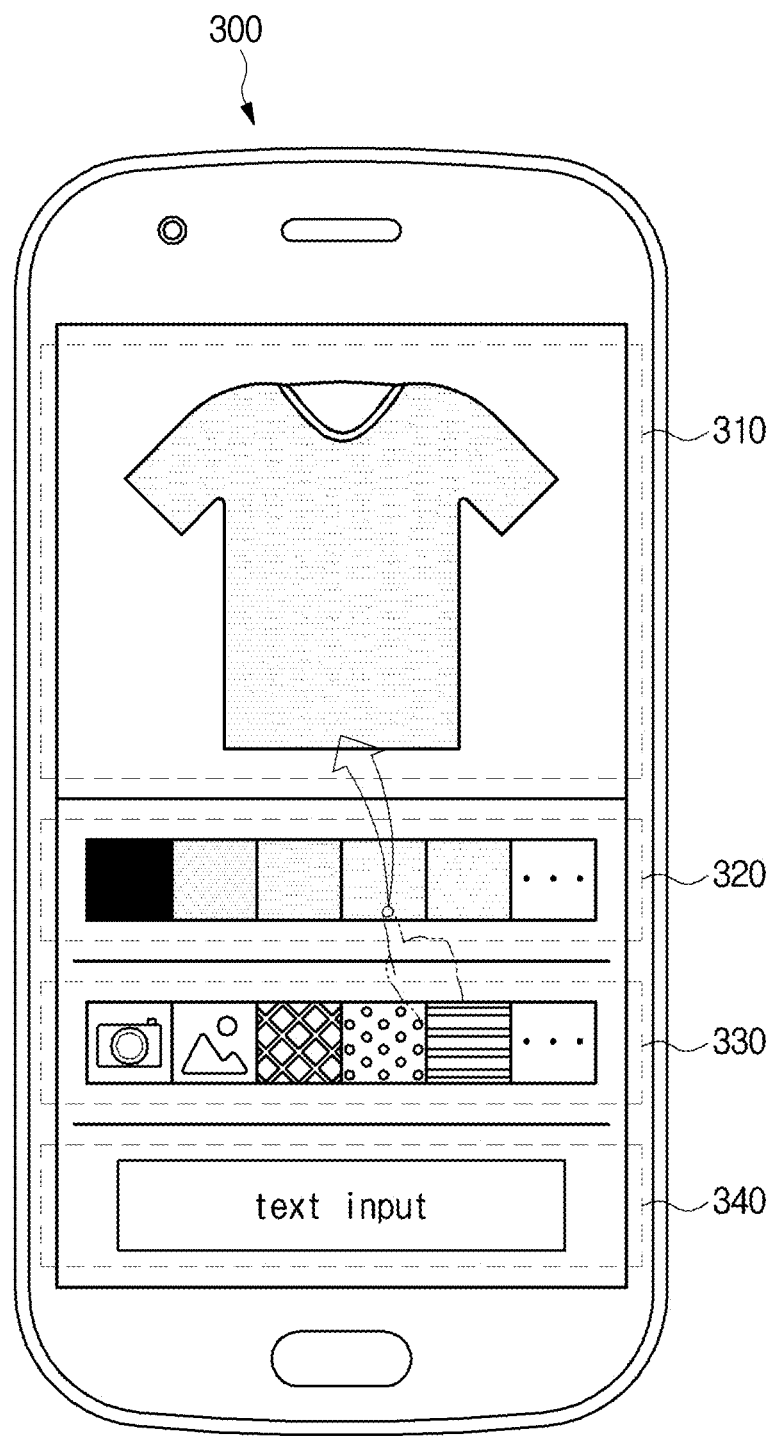

[Fig. 6]
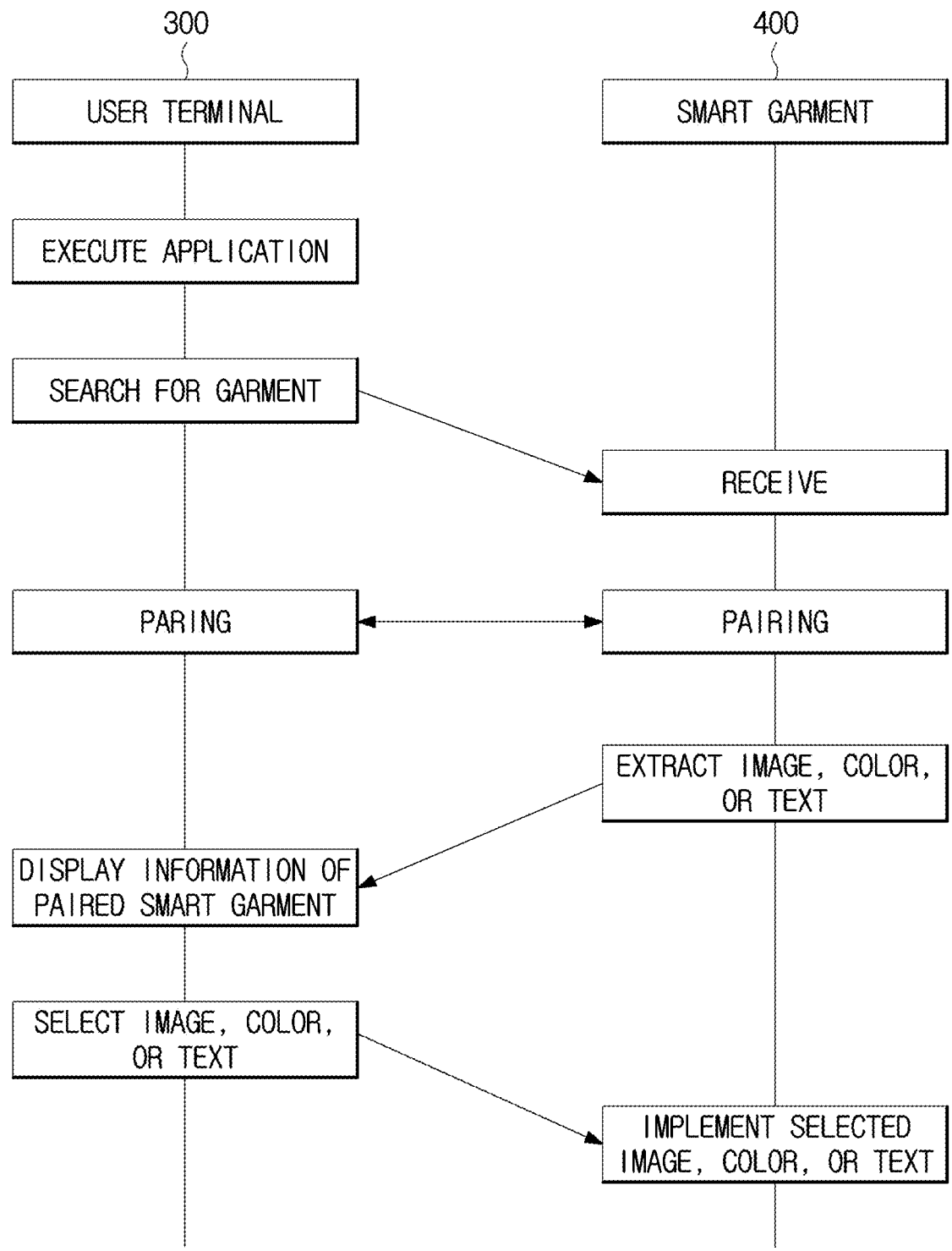

[Fig. 7]
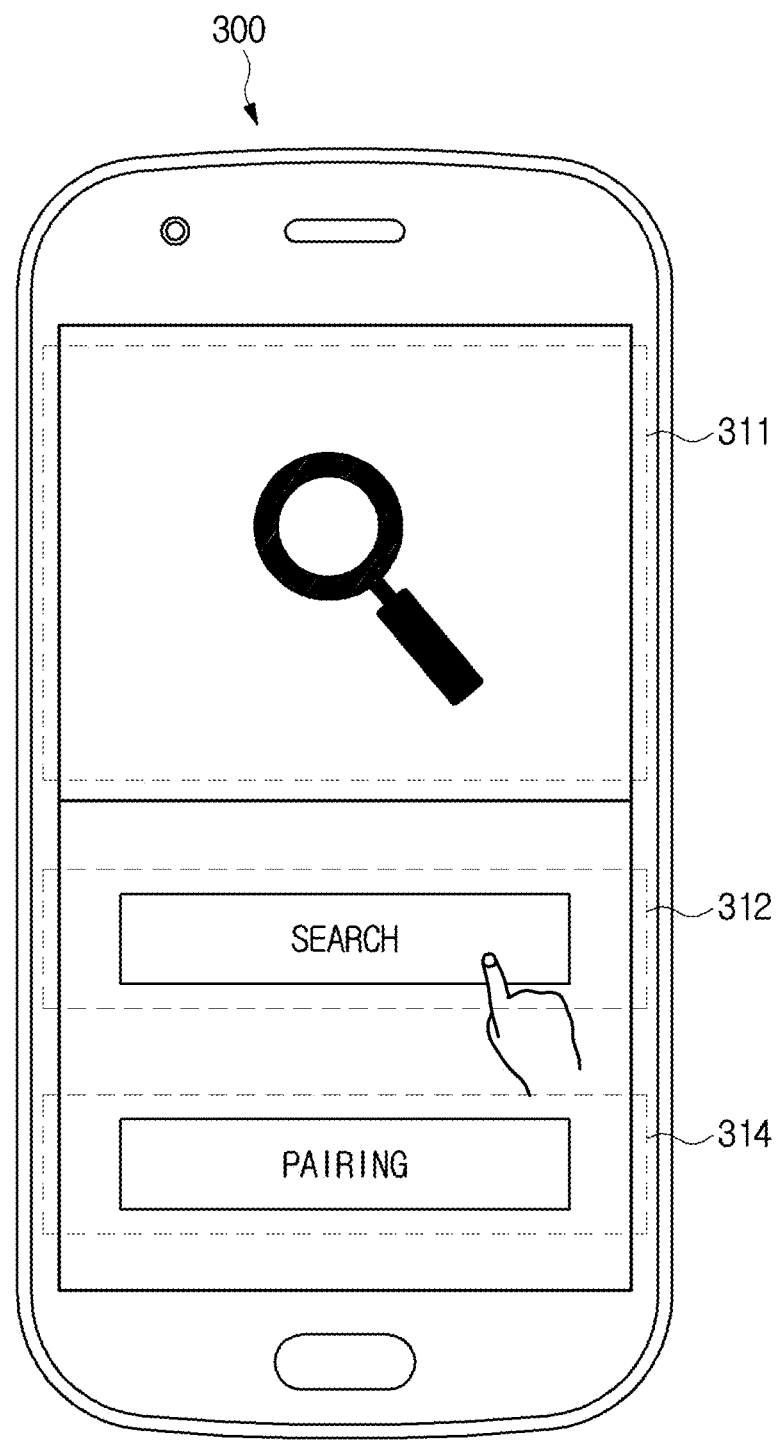

[Fig. 8]
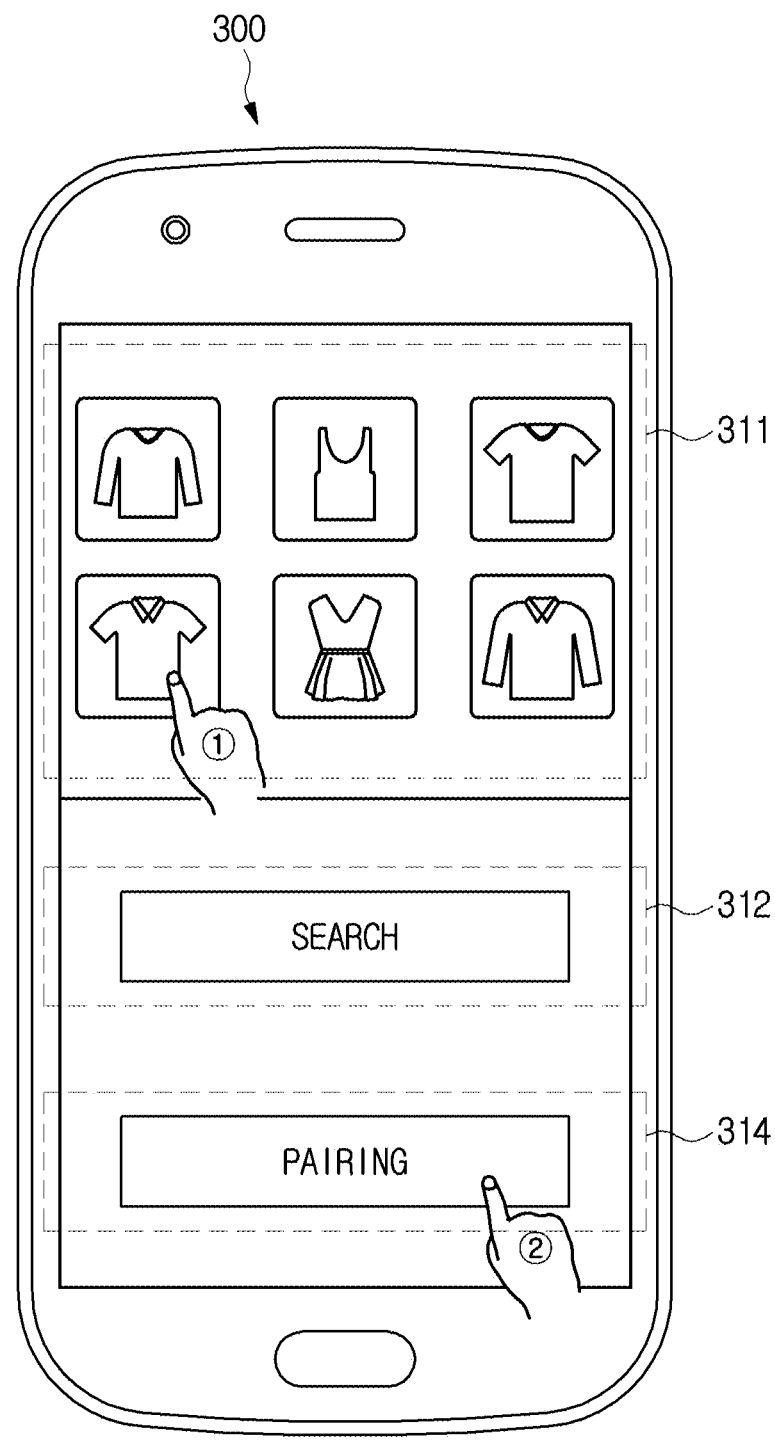

【Fig. 9】
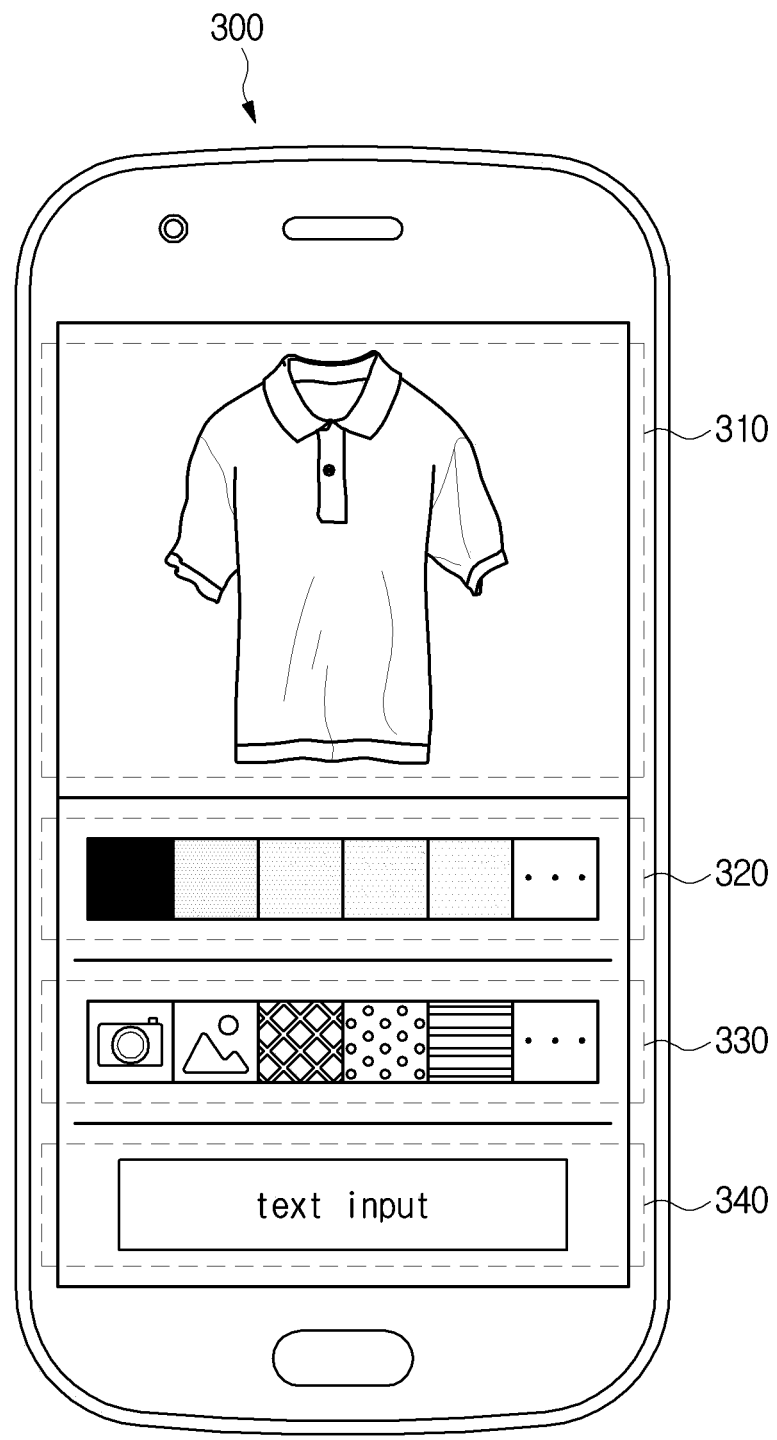

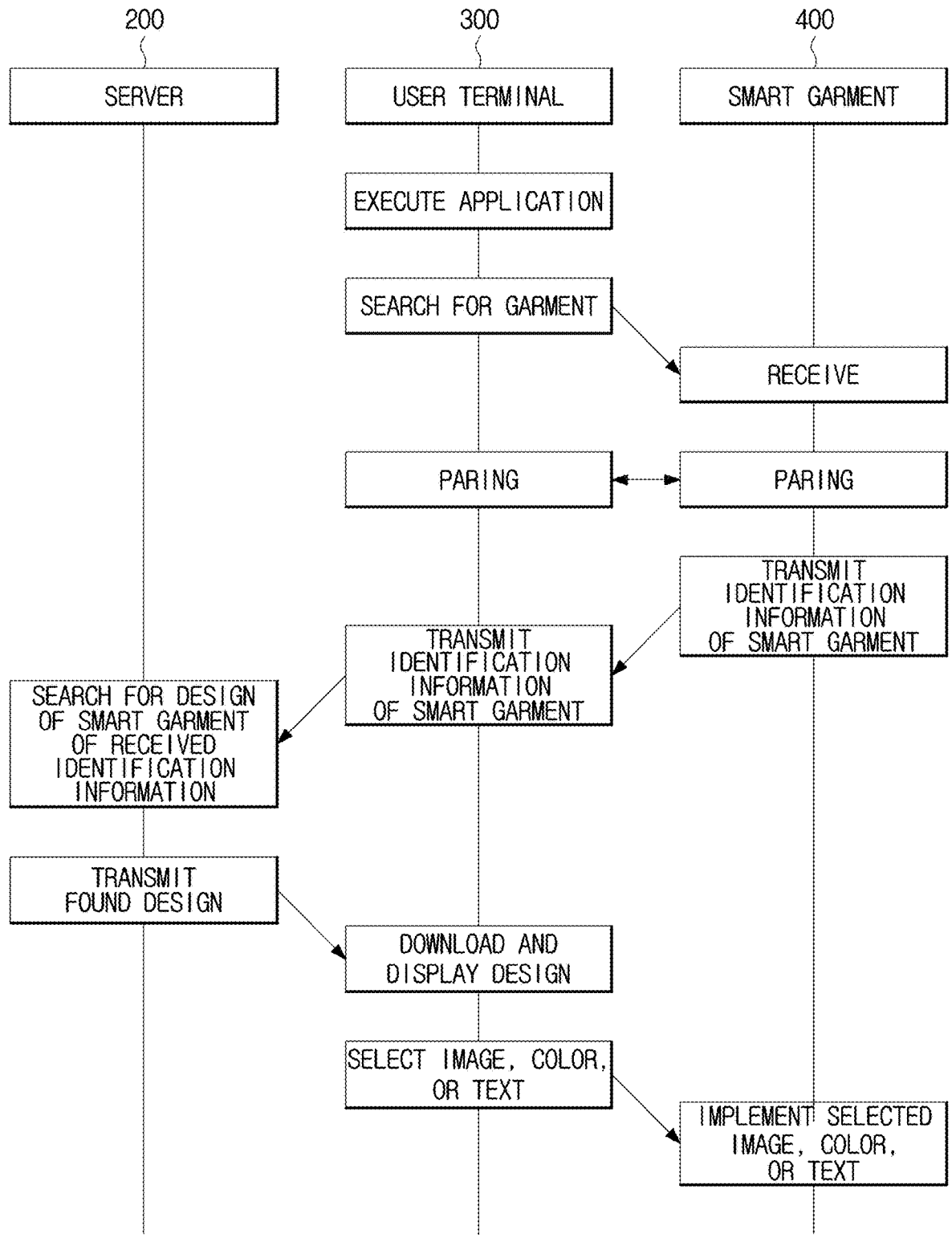
[Fig. 10]

[Fig. 11]
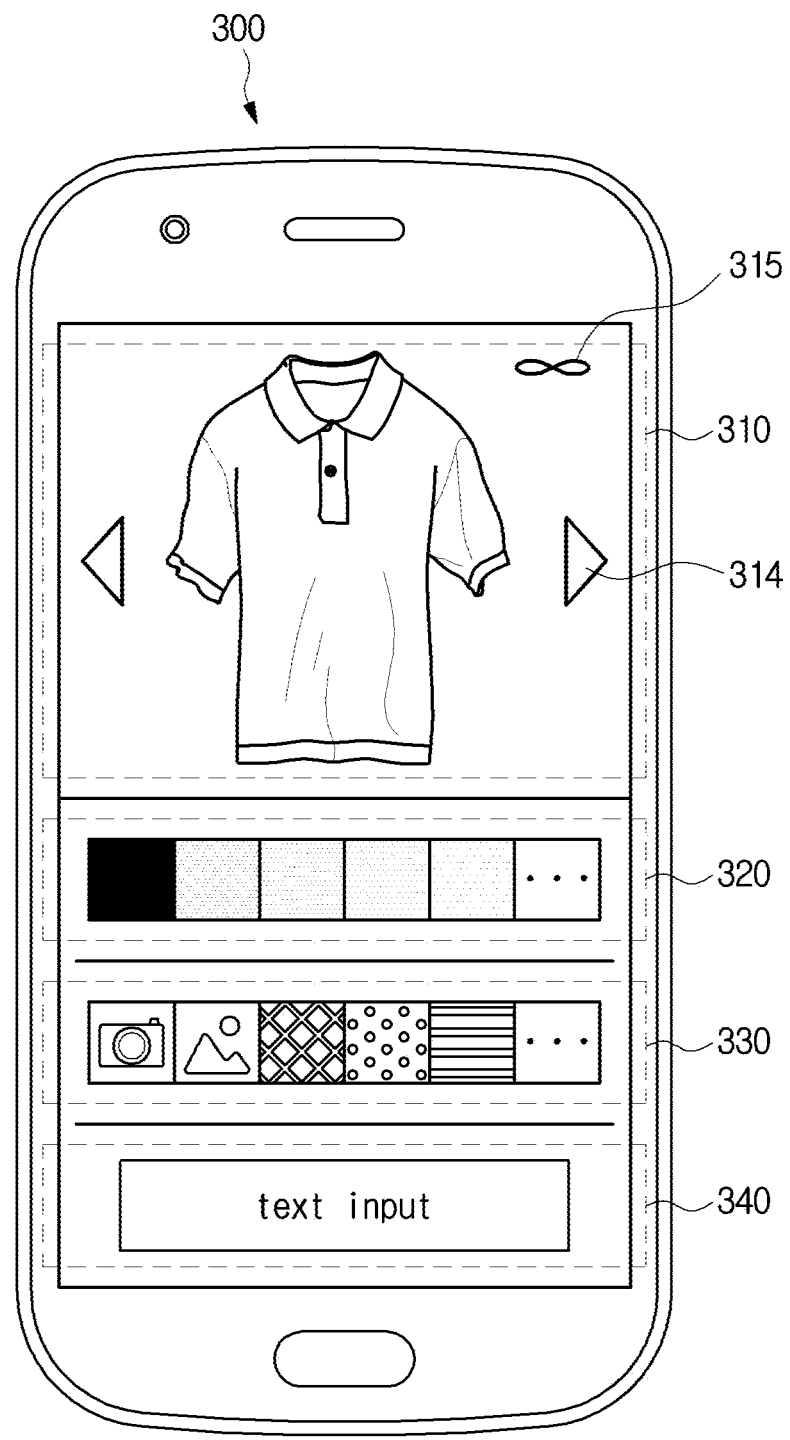

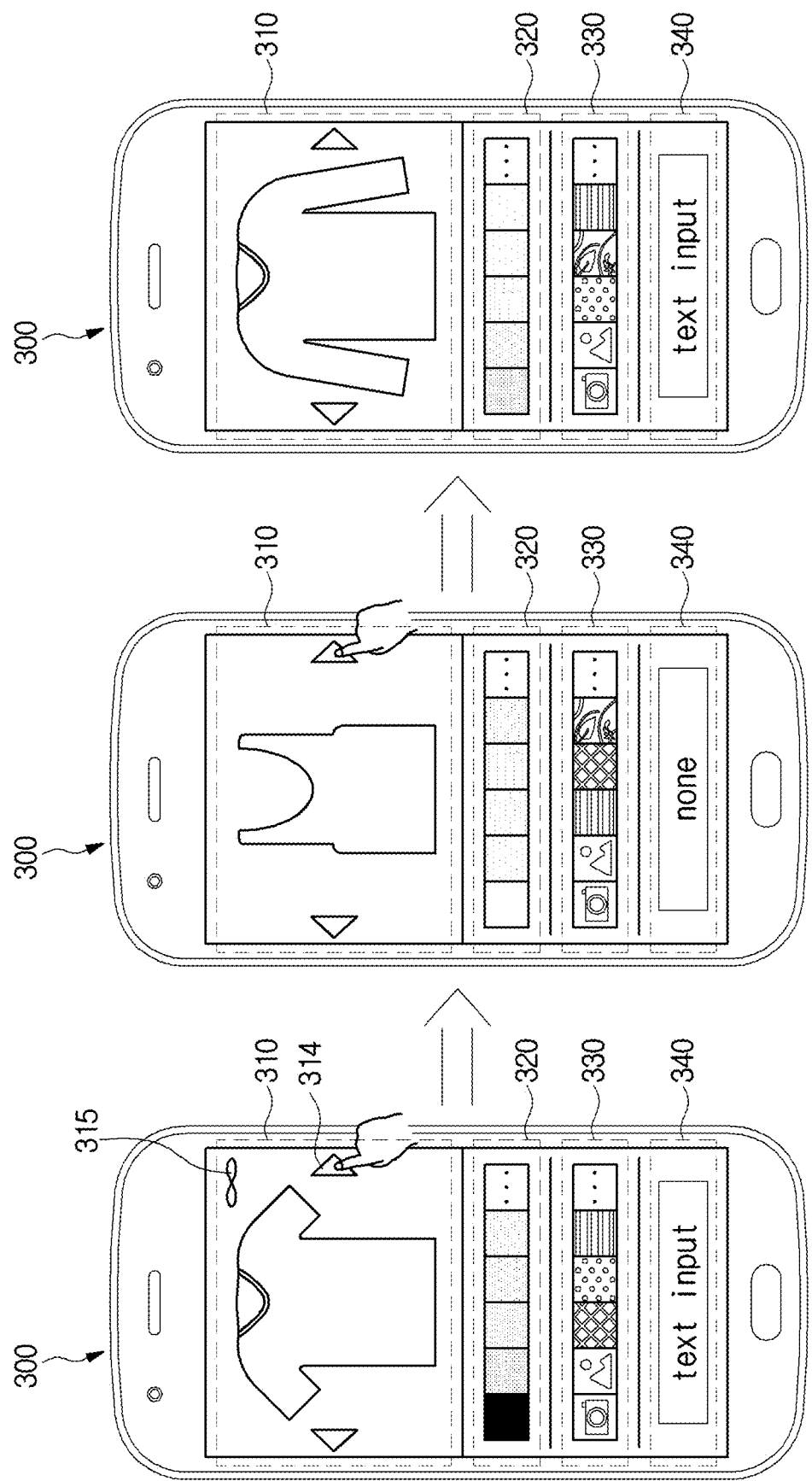
[Fig. 12]

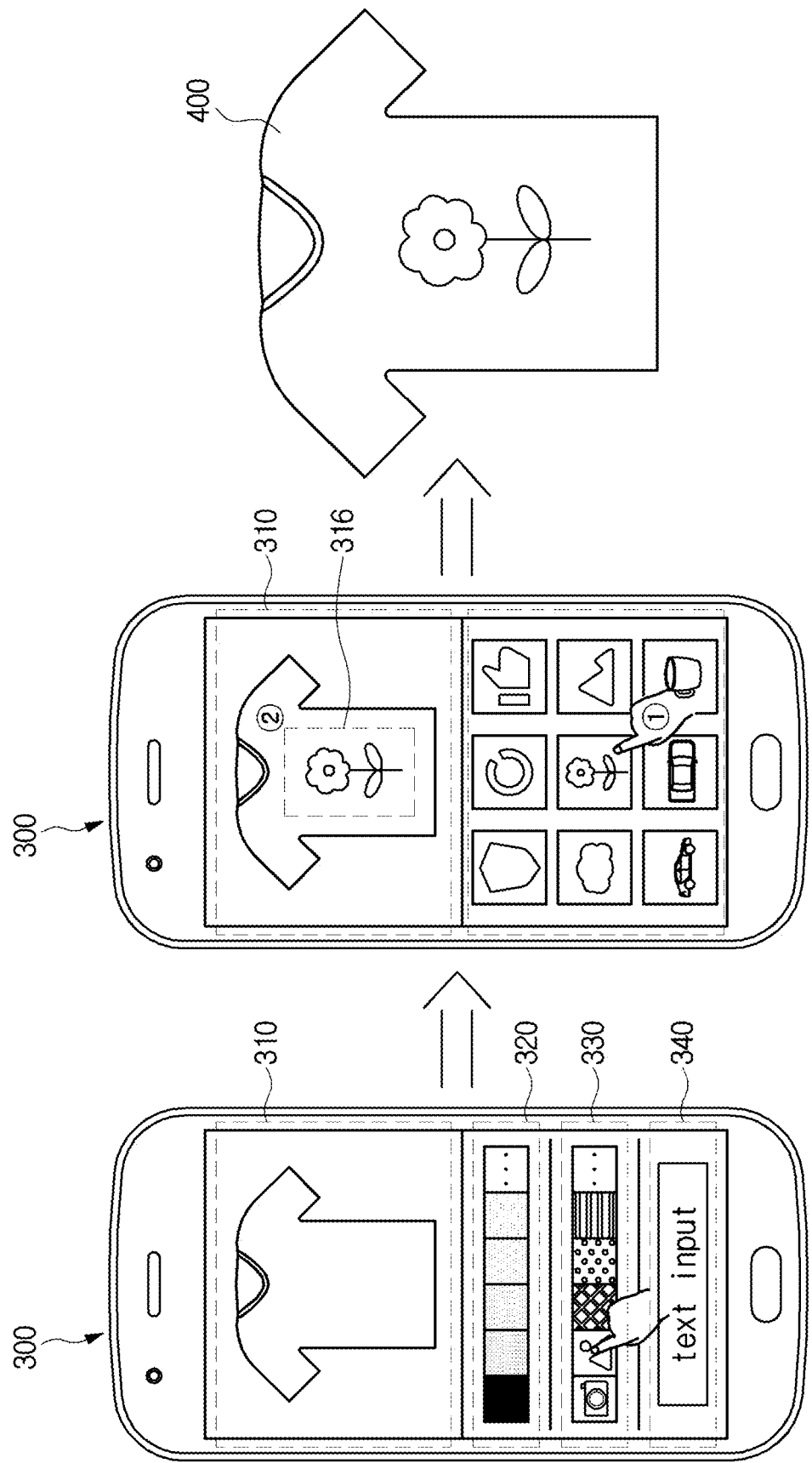

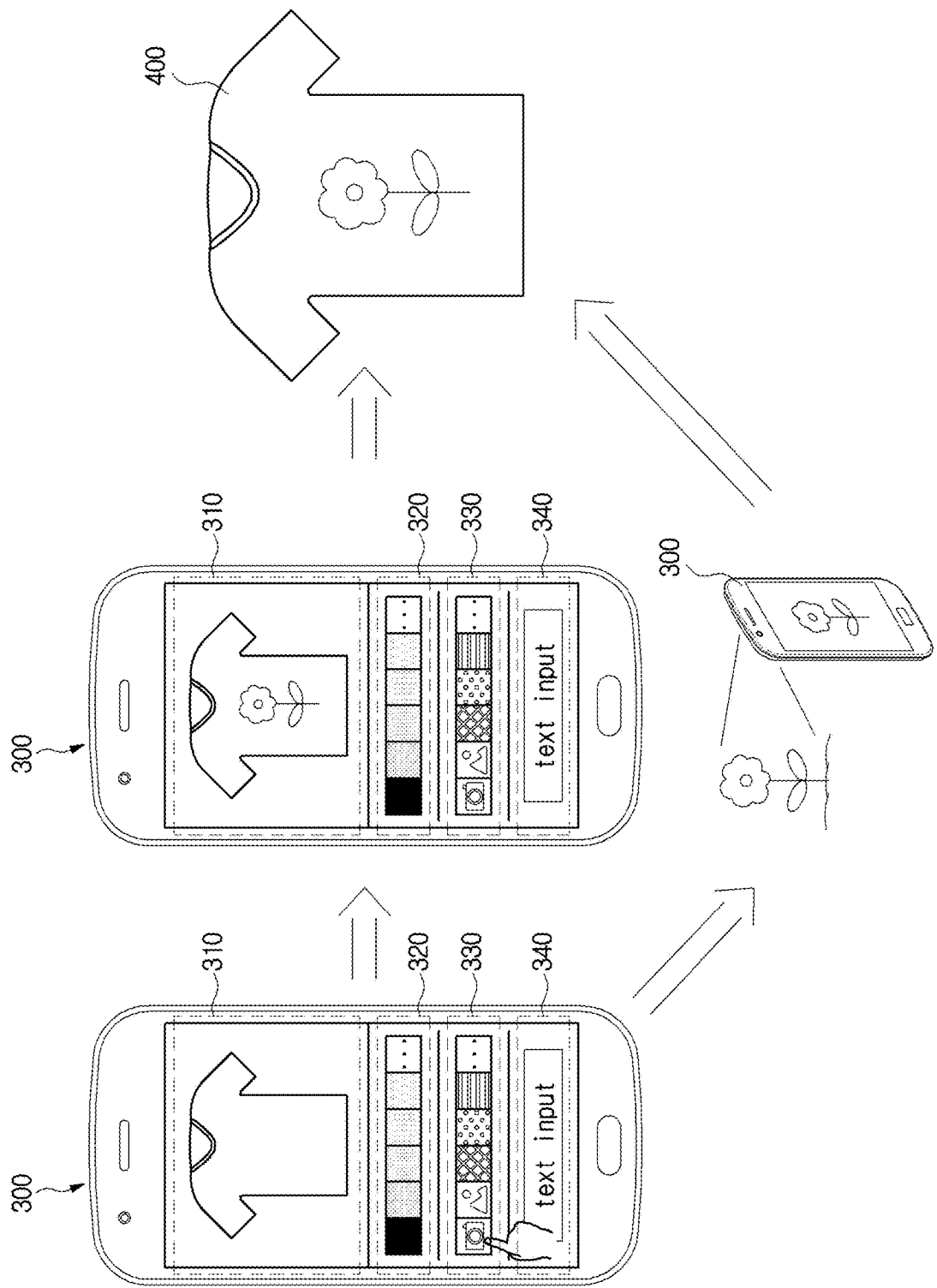

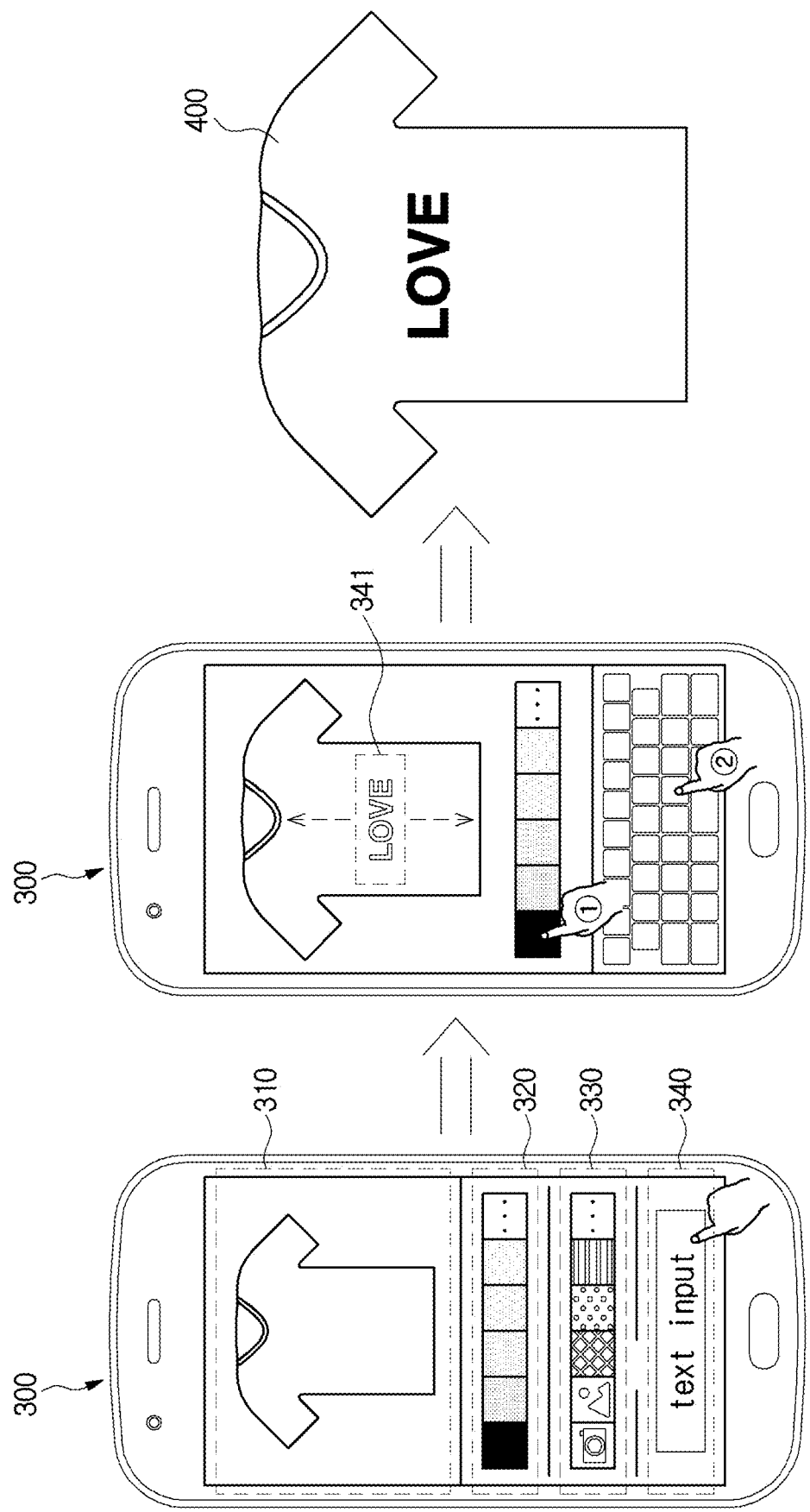

[Fig. 16]

[Fig. 17a]
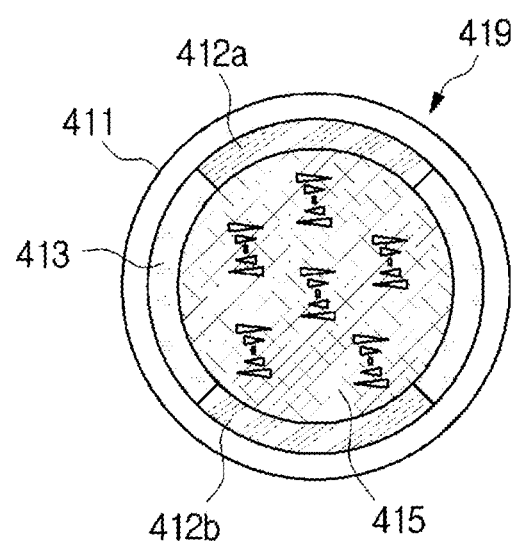

[Fig. 17b]
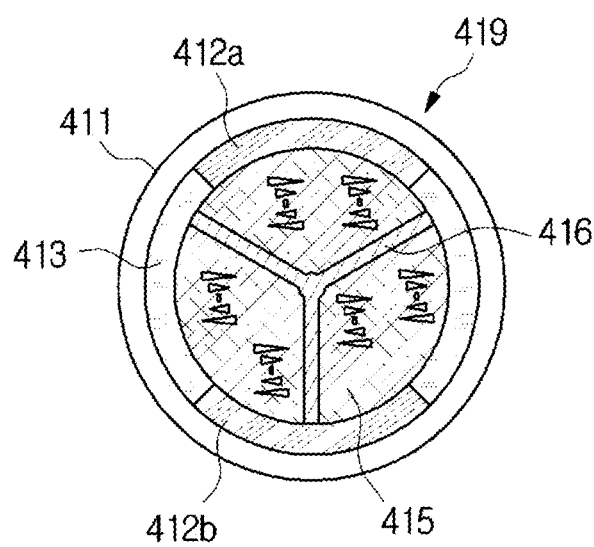

[Fig. 17c]
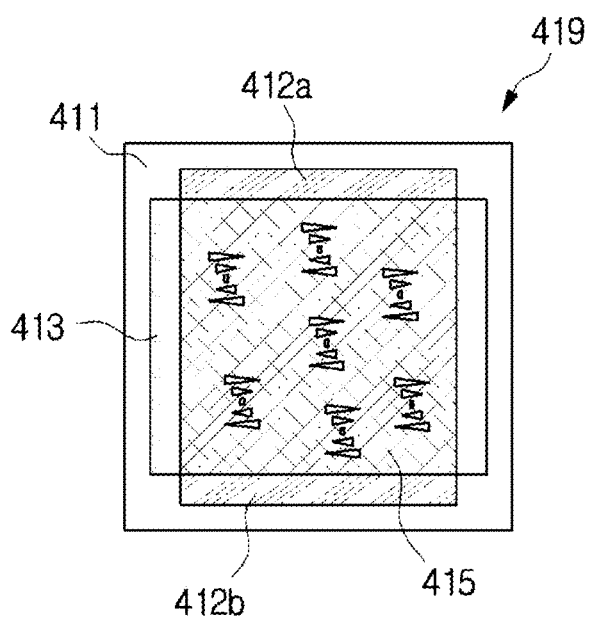

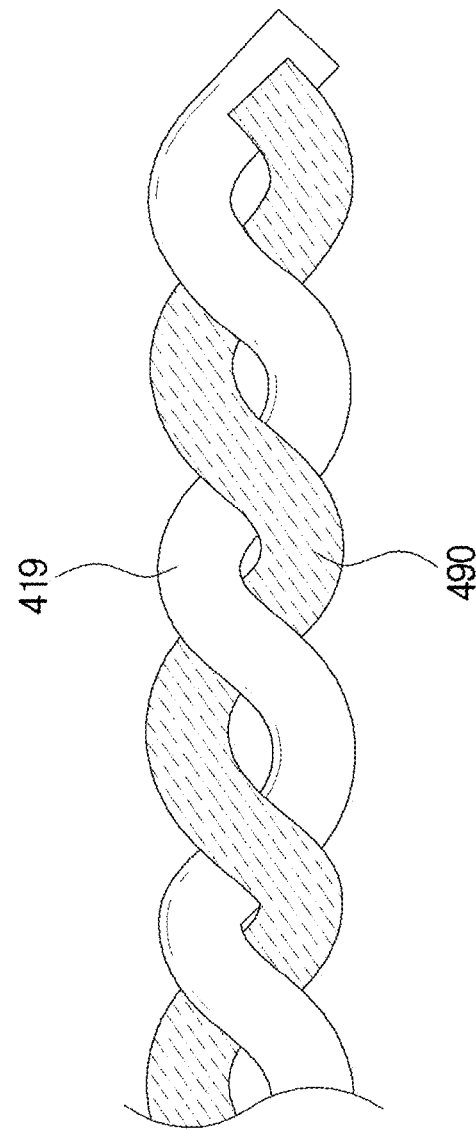
[Fig. 18]

[Fig. 19]
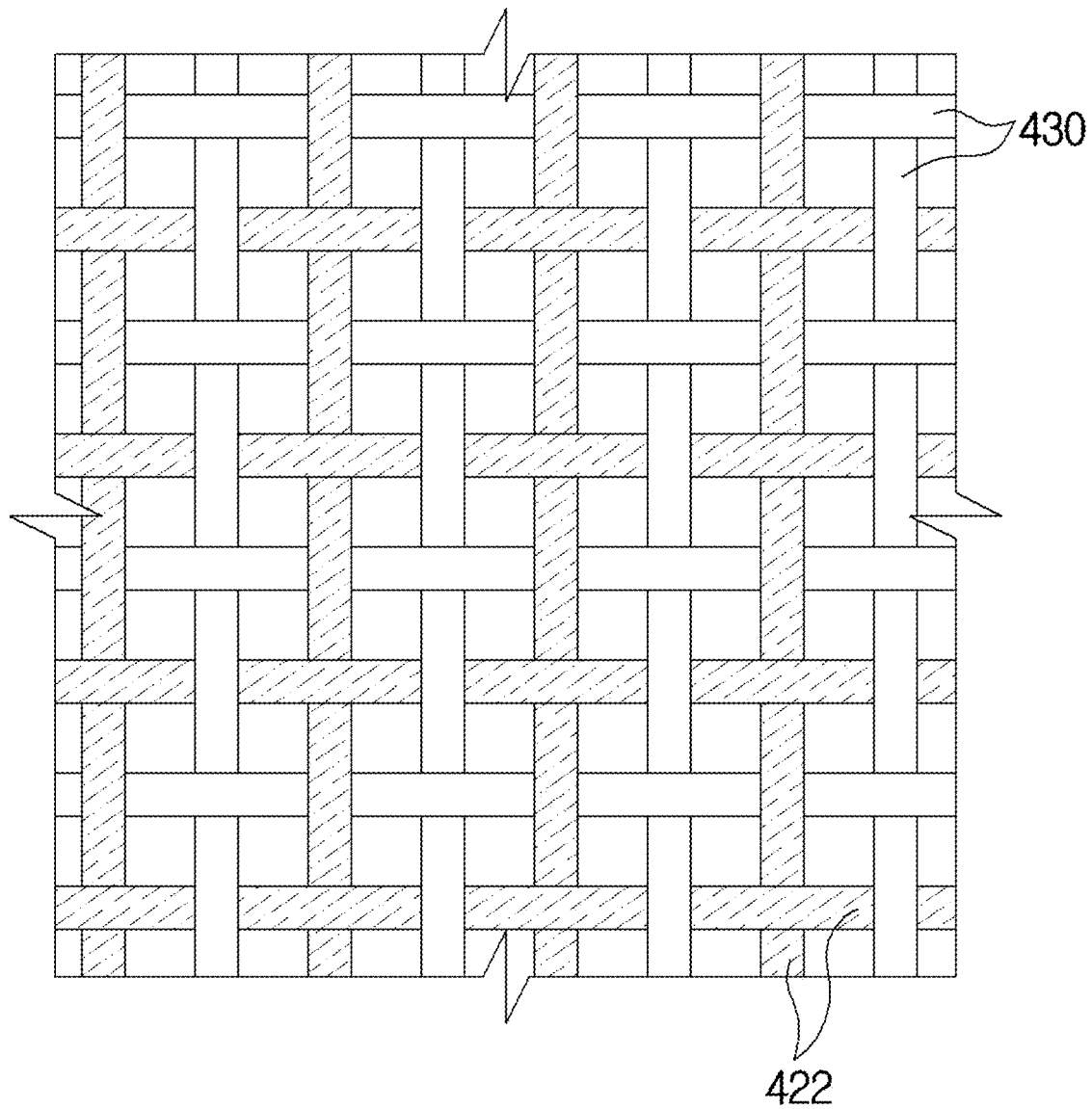

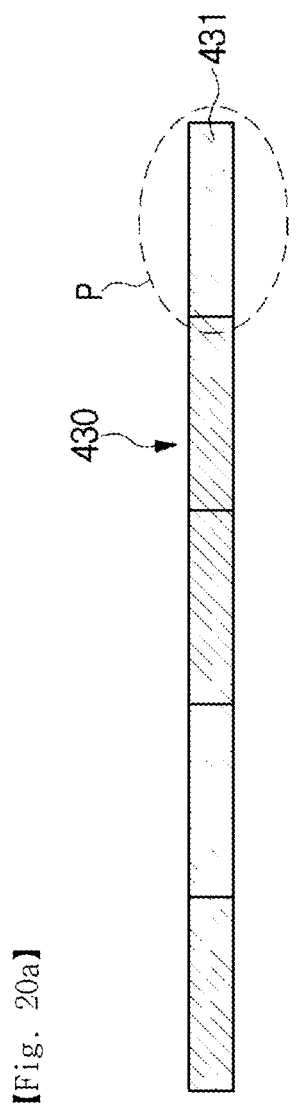
[Fig. 20a]

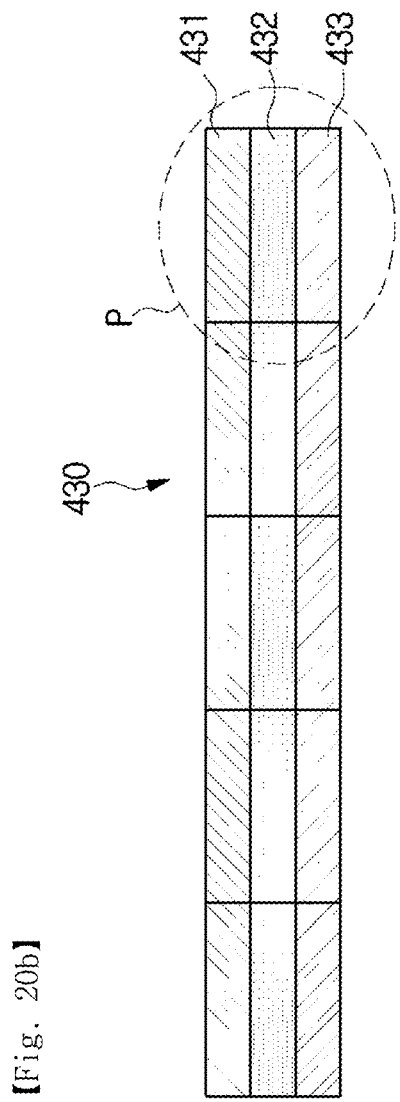
[Fig. 20b]

[Fig. 20c]
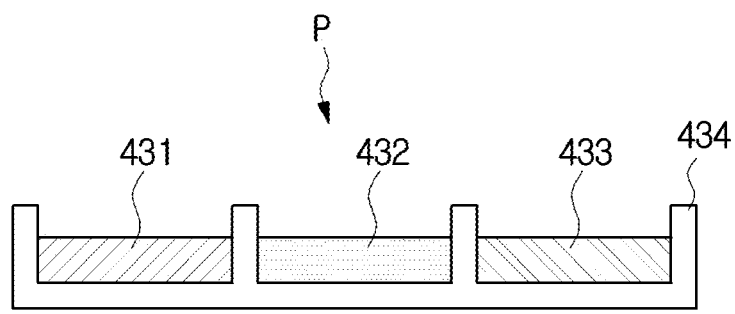

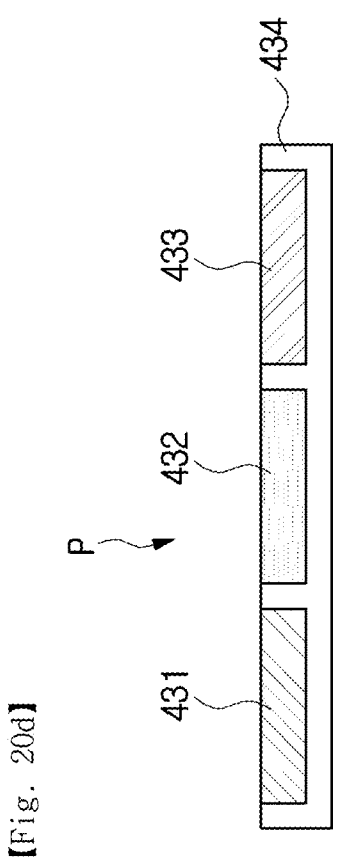
[Fig. 20d]

[Fig. 20e]
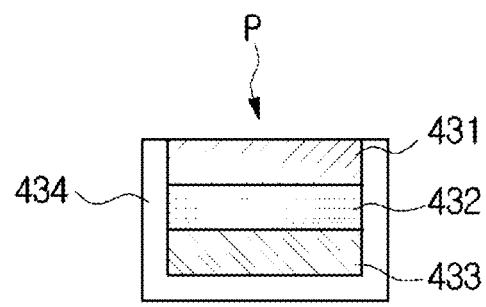

[Fig. 21a]
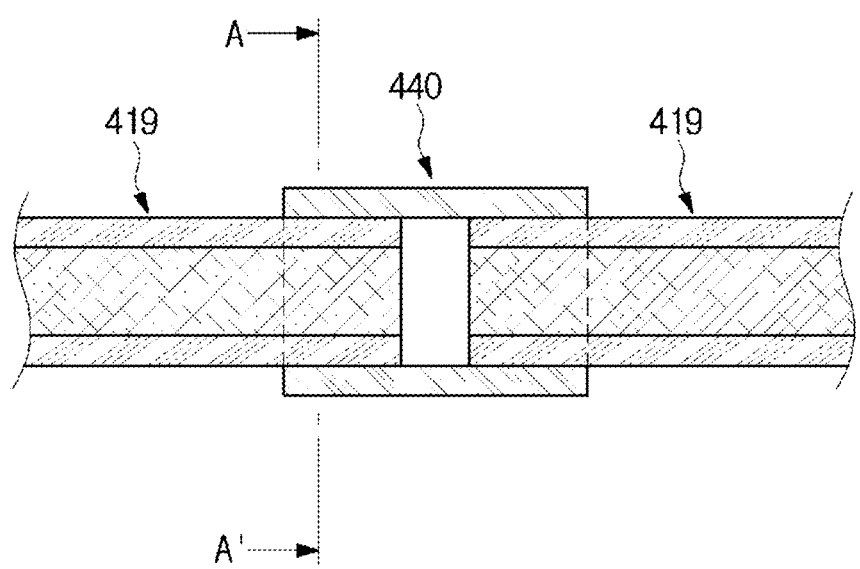

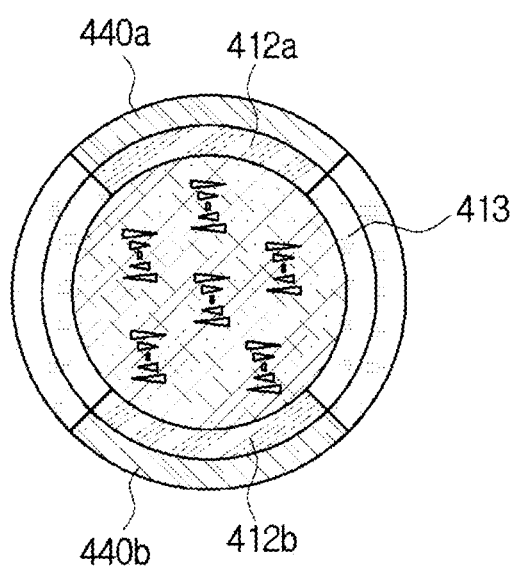
[Fig. 21b]

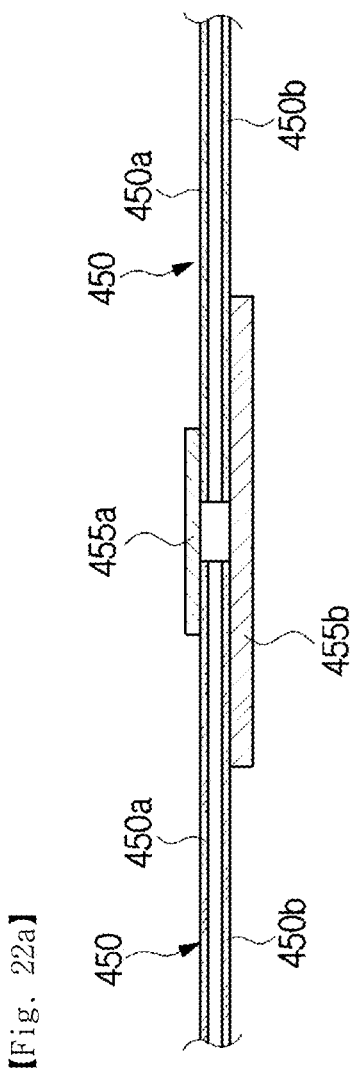

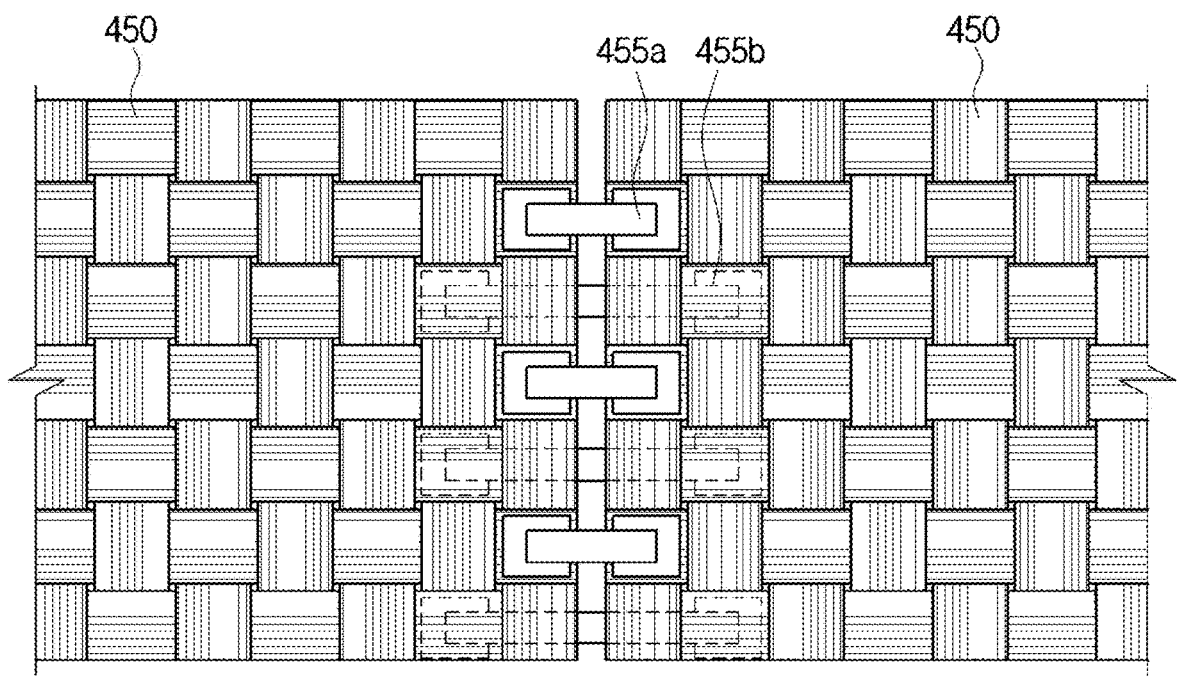
[Fig. 22b]

[Fig. 23a]
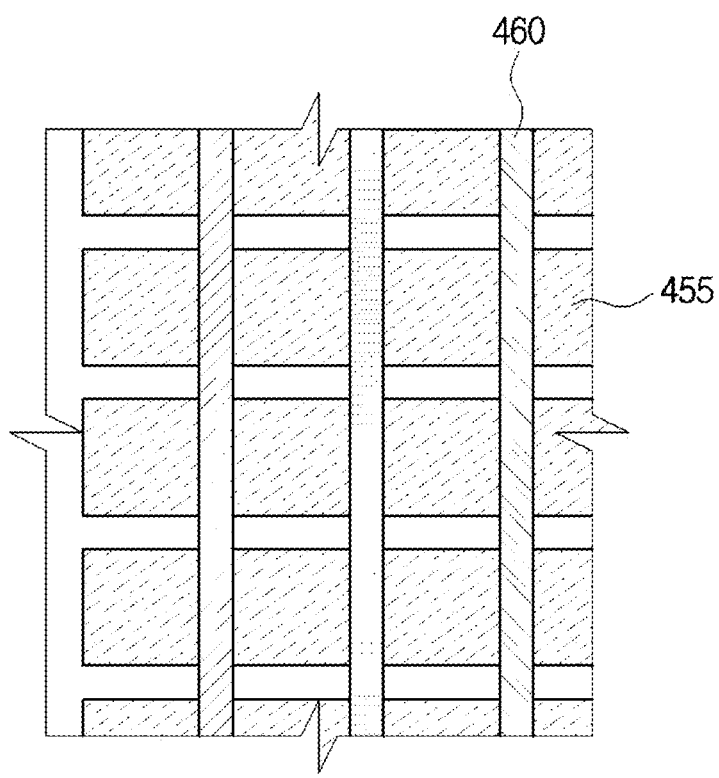

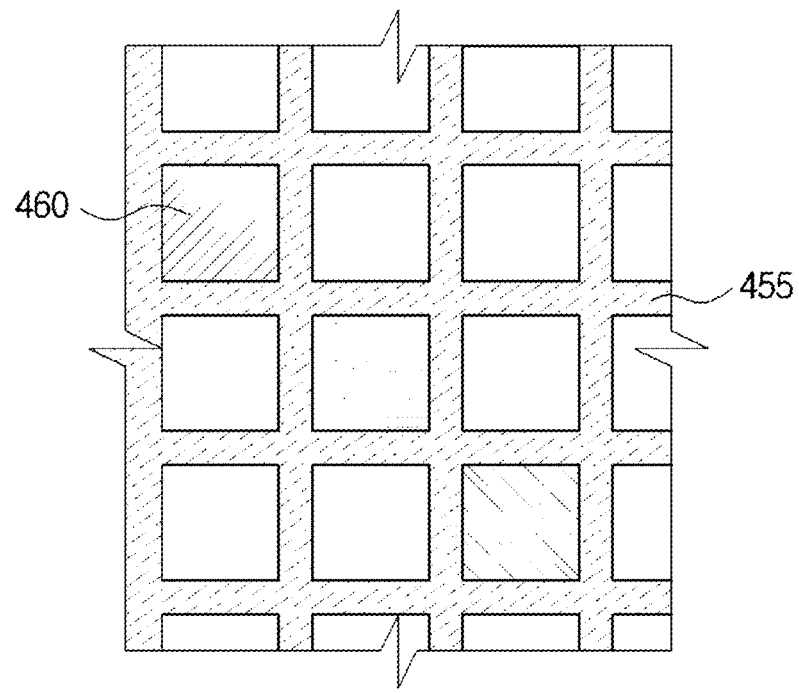
[Fig. 23b]

[Fig. 24]
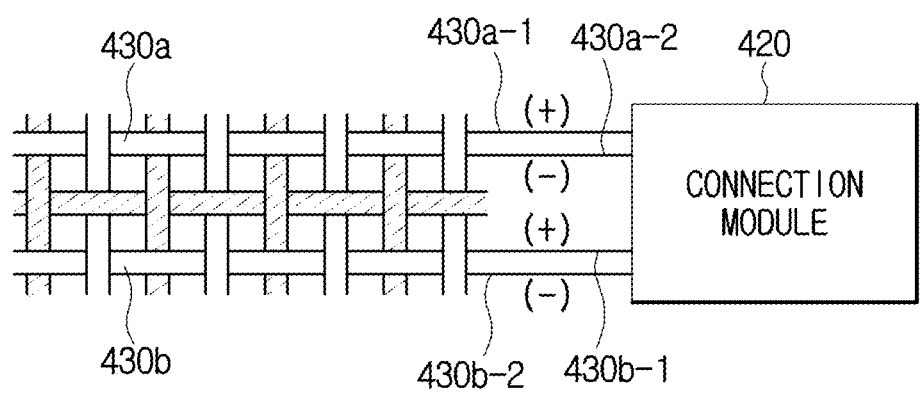

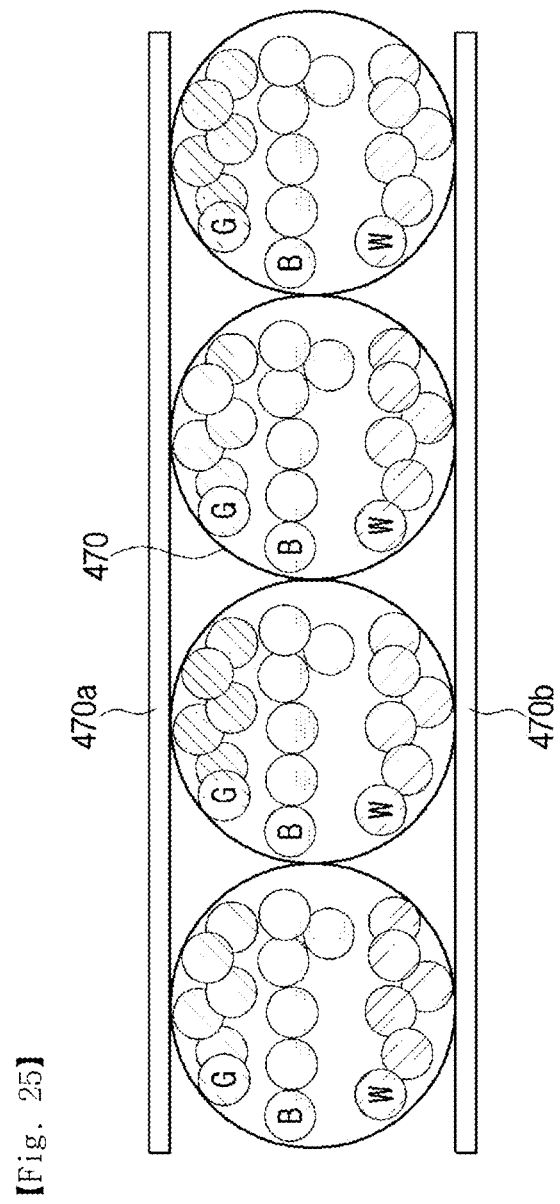
[Fig. 25]

[Fig. 26]
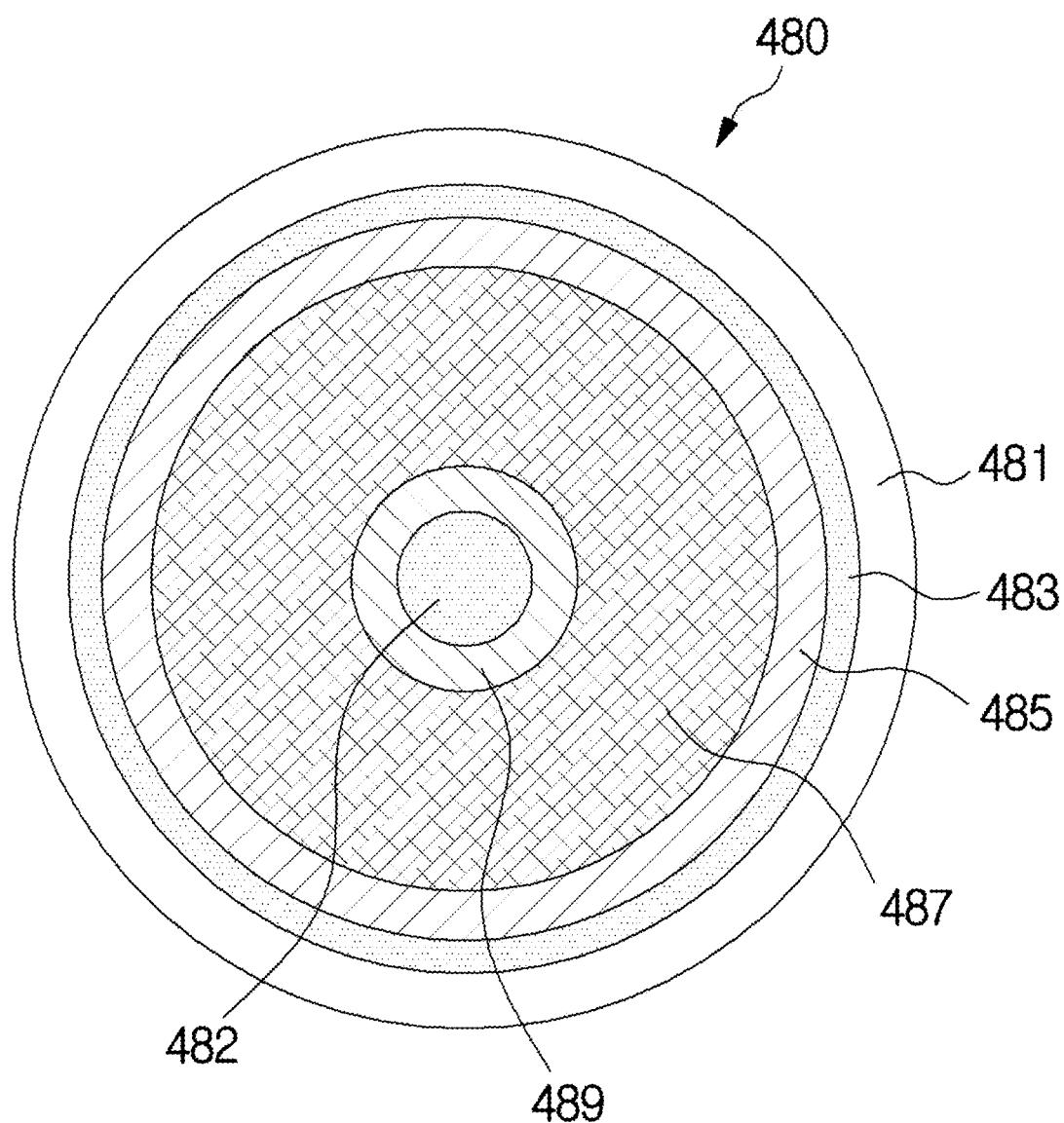

[Fig. 27a]
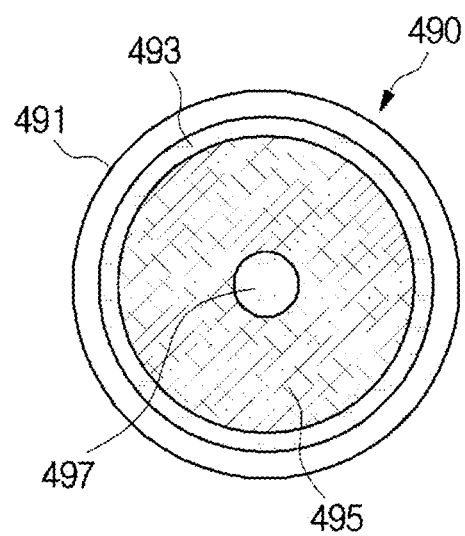

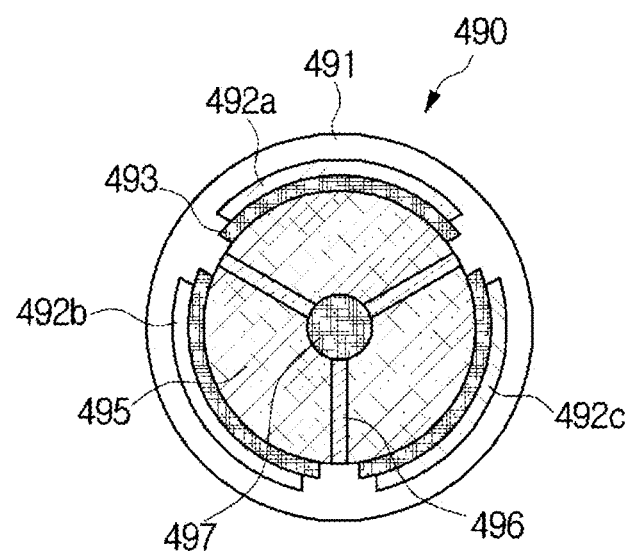
[Fig. 27b]

[Fig. 27c]
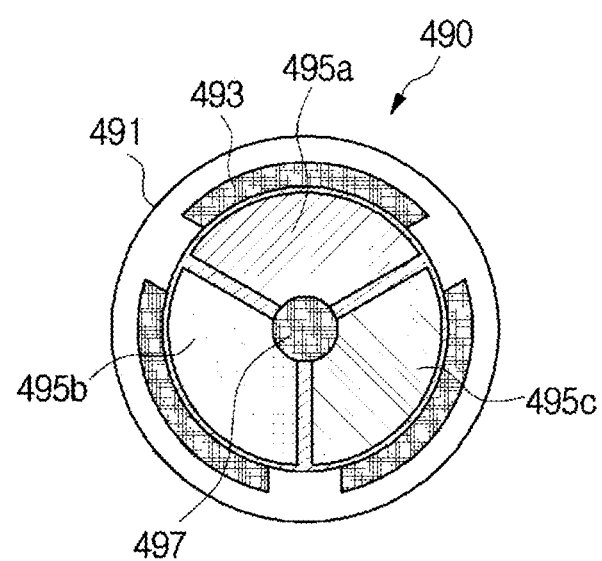

[Fig. 27d]
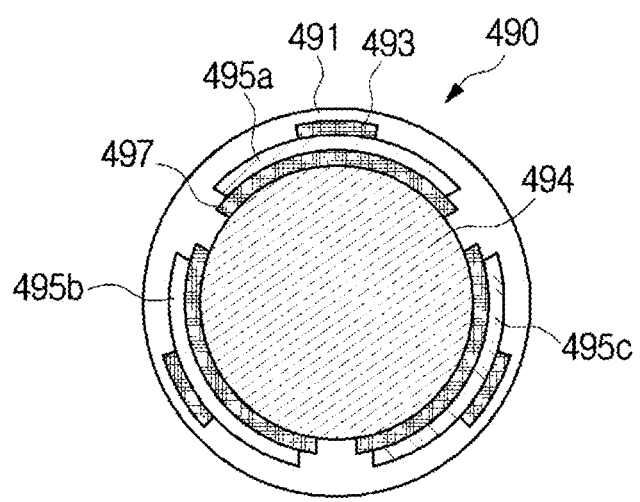

SMART GARMENT, USER TERMINAL, SYSTEM INCLUDING SAME, AND METHOD OF CHANGING DESIGN OF SMART GARMENT

CROSS-REFERENCE TO RELATED APPLICATIONS

This application is a continuation of U.S. patent application Ser. No. 15/765,484 filed on Apr. 2, 2018, which is a 371 of International Application No. PCT/KR2016/003403 filed Apr. 1, 2016, which claims priority to Korean Patent Application No. 10-2015-0139231 filed Oct. 2, 2015, the disclosures of which are herein incorporated by reference in their entirety.

BACKGROUND

1. Field

The disclosed technology relates to a garment capable of changing a design, such as a color, an image, or the like.

2. Description of Related Art

Recently, various wearable devices equipped with an Internet function are being developed. Along with this trend, the technology of Internet of Things (IoT) is continuously developing.

Research has been continuously conducted to develop garments that perform various functions by introducing IoT technology to people's clothing in addition to electrical appliances.

SUMMARY

Disclosed embodiments provide a smart garment capable of changing design, such as a color, an image, or text, which are implemented on the garment.

In addition, disclosed embodiments provide a system including a server which provides various designs to be implemented on a smart garment and a user terminal which receives the various designs from the server and transmits the designs to the smart garment to change a design of the smart garment.

A system according to the disclosed embodiment includes: a smart garment provided to allow a design including a color, an image, text, and combinations thereof to be changed; a server including a design database with respect to the smart garment; a provider terminal provided to upload a design of the smart garment to the server; and a user terminal provided to download the design of the smart garment from the server and transmit a signal corresponding to the design of the smart garment to the smart garment to change the design of the smart garment.

Further, the smart garment may include a fabric including color-changing fibers and textile fibers, and a connection module provided to receive the signal transmitted by the user terminal.

Further, the color-changing fiber may include at least one of a cholesteric liquid crystal fiber, an electronic ink fiber, an electrochromic fiber, and an electroluminescent fiber.

Further, the user terminal may be paired with the smart garment and transmit a design selected by a user to the paired smart garment.

Further, the user terminal may display a garment display area provided to allow the smart garment to be displayed, a color selection area provided to allow a color of the smart garment displayed in the garment display area to be selected, an image selection area provided to allow an image, which will be implemented on the smart garment displayed in the garment display area, to be selected, and a text input area provided to allow text, which will be implemented on the smart garment displayed in the garment display area, to be input.

A user terminal according to the disclosed embodiment includes: a communicator configured to communicate with a server and a smart garment; a display configured to display a design of the smart garment transmitted from the server and received by the communicator; and a processor configured to transmit a signal including selected design information to the smart garment through the communicator when the design of the smart garment displayed on the display is selected.

Further, the display may display a search button provided to receive a command for searching for a smart garment, a garment display area in which a found smart garment is displayed when the command is input via the search button, and a pairing button provided to receive a command for pairing with a garment selected among garments displayed on the garment display area.

Further, when the selected smart garment is paired with the user terminal through the pairing button, the display may display the paired smart garment in the garment display area.

Further, when the command is input via the search button, the processor may search for smart garments around the user terminal and be paired with a smart garment selected by a user among the found smart garments when the command is input via the pairing button.

Further, the display may display a garment display area in which the smart garment is displayed, a color selection area provided to allow a color of the smart garment displayed in the garment display area to be selected, an image selection area provided to allow an image, which will be implemented on the smart garment displayed in the image display area, to be selected, and a text input area provided to allow text, which will be implemented on the smart garment displayed in the garment display area, to be input.

Further, the display may display the color selection area below the garment display area, display the image selection area below the color selection area, and display the text input area below the image selection area.

Further, when the smart garment displayed in the garment display area is paired with the user terminal, the display may display an object representing that the smart garment displayed in the garment display area is paired with the user terminal.

Further, when the smart garment displayed in the garment display area is changed, the display may change a color and a type of an image displayed in the color selection area and the image selection area to a color and an image which are associated with the changed smart garment, and display the changed color and image.

Further, the display may display at least one of an image received from the server, an image stored in the user terminal, and an object for driving a camera of the user terminal in the image selection area.

Further, when the object is selected and capturing of the camera is performed, the display may apply an image captured by the camera to the smart garment displayed in the garment display area.

Further, the processor may transmit the captured image to the smart garment.

Further, when the image displayed in the image selection area is selected, the processor may transmit the selected image to the smart garment and the display may display the selected image on the smart garment displayed in the garment display area.

Further, when the color displayed in the color selection area is selected, the processor may transmit the selected color to the smart garment and the display may apply the selected color to the smart garment displayed in the garment display area.

Further, when text is input to the text input area, the processor may transmit the input text to the smart garment and the display may display the input text on the smart garment displayed in the garment display area.

Further, the processor may generate a design, which will be implemented on the smart garment on the basis of location information or weather information, and transmit the generated design to the smart garment through the communicator.

Further, the processor may generate a design based on surrounding information of the user terminal and transmit the generated design to the smart garment.

A smart garment according to the disclosed embodiment includes: a first material including a first electrode and a second electrode; a second material including a third electrode and a fourth electrode; and a connection module including a first ground terminal configured to ground any one of the first electrode and the second electrode in response to a signal transmitted by a user terminal, a first signal terminal applying a voltage to the remaining one of the first electrode and the second electrode, a second ground terminal configured to ground any one of the third electrode and the fourth electrode, and a second signal terminal applying a voltage to the remaining one of the third electrode and the fourth electrode.

Further, the connection module may include a connector provided to be connected to the user terminal using a wire.

Further, the connection module may include a communicator provided to communicate with the user terminal through wired/wireless communication.

Further, when the communicator receives a signal transmitted by the user terminal, the connection module may include at least one driver provided to apply a voltage to the smart garment in response to the received signal.

Further, when the communicator receives the signal transmitted by the user terminal, the connection module may include a processor provided to generate a control signal for controlling the at least one driver.

Further, the connection module may include a memory provided to store information on the smart garment and, when the communicator receives the signal transmitted by the user terminal, provided to store information included in the received signal.

Further, the connection module may include a battery provided to supply power.

Further, the first material and the second material may include cholesteric liquid crystal fibers.

Further, the cholesteric liquid crystal fiber may include a cholesteric liquid crystal, a first electrode provided at one side of the cholesteric liquid crystal, a second electrode provided at a side opposite the first electrode, an insulator provided between the first electrode and the second electrode, and a protective layer provided to cover the first electrode, the second electrode, and the insulator.

Further, the cholesteric liquid crystal fiber may further include a connection portion provided to connect the cholesteric liquid crystal fibers so as to extend the cholesteric liquid crystal fiber.

Further, the connection portion may include a first connection electrode provided to connect the first electrodes of the cholesteric liquid crystal fibers, a second connection electrode provided to connect the second electrodes of the cholesteric liquid crystal fibers, and an insulator provided between the first connection electrode and the second connection electrode.

Further, the cholesteric liquid crystal may include a partition wall provided to maintain a shape of the cholesteric liquid crystal fiber.

Further, a cross section of the cholesteric liquid crystal fiber may be provided in any one of a circular shape and a polygonal shape.

Further, the cholesteric liquid crystal may include a pixel including at least one of a red sub-cell configured to reflect red light, a green sub-cell configured to reflect green light, and a blue sub-cell configured to reflect blue light.

Further, the pixel may be provided so that the red sub-cell, the green sub-cell, and the blue sub-cell are formed to be coplanar.

Further, the pixel may be provided so that the red sub-cell, the green sub-cell, and the blue sub-cell are formed to have a stacked structure.

Further, the cholesteric liquid crystal may include a grid provided to separates the red sub-cell, the green sub-cell, and the blue sub-cell.

Further, the grid may include textile fibers.

Further, the first material and the second material may include electronic ink fibers.

Further, the electronic ink fiber may include a plurality of electronic ink capsules including an electronic ink, a first electrode provided at one side of the electronic ink capsules, a second electrode provided at a side opposite the first electrode, an insulator provided between the first electrode and the second electrode, and a protective layer provided to cover the first electrode, the second electrode, and the insulator.

Further, the electronic ink capsule may include at least one electronic ink among a red electronic ink configured to reflect red light, a green electronic ink configured to reflect green light, and a blue electronic ink configured to reflect blue light, a black electronic ink configured to absorb light, and a white electronic ink configured to reflect light.

Further, the first material and the second material may include electrochromic fibers.

Further, the electrochromic fiber may include a first electrode, a counter electrode provided outside the first electrode, an electrolyte provided outside the counter electrode, a working electrode provided outside the electrolyte, a second electrode provided outside the working electrode, and a protective layer provided to cover the second electrode.

Further, at least one of the counter electrode and the working electrode may include a color-changing material.

Further, the counter electrode may include a first color-changing material that changes color as the first color-changing material is oxidized.

Further, the working electrode may include a second color-changing material that changes color as the second color-changing material is reduced.

Further, the first material and the second material may include electroluminescent fibers.

Further, the electroluminescent fiber may include a first electrode, a light emitter provided outside the first electrode, a second electrode provided outside the light emitter, and a protective layer provided to cover the second electrode.

Further, the electroluminescent fiber may include a first electrode, a light emitter provided outside the first electrode, at least three second electrodes provided outside the light emitter and provided not in contact with each other, a red color filter, a green color filter, and a blue color filter which are each provided outside a corresponding one of the at least three second electrodes, and a protective layer provided to cover the red color filter, the green color filter, and the blue color filter.

Further, the electroluminescent fiber may include a first electrode, a red light emitter, a green light emitter, and a blue light emitter provided outside the first electrode, a second electrode provided outside each of the red light emitter, the green light emitter, and the blue light emitter, and a protective layer provided to cover the second electrode.

Further, the electroluminescent fiber may include a core fiber, at least three first electrodes provided outside the core fiber and provided not in contact with each other, a red light emitter, a green light emitter, and blue light emitter each provided outside a corresponding one of the at least three first electrodes, a second electrode provided outside each of the red light emitter, the green light emitter, and the blue light emitter, and a protective layer provided to cover the second electrode.

A method of changing a design of a smart garment according to the disclosed embodiment includes: receiving, at a user terminal, a design of a smart garment including a color, an image, text, and combinations thereof from a server; displaying the received design on the user terminal; and when the displayed design is selected, transmitting the selected design from the user terminal to the smart garment so that a design of the smart garment is changed to the selected design.

Further, the method may further include: searching for a smart garment in the user terminal; displaying a found smart garment in the user terminal; and when the displayed smart garment is selected, pairing the smart garment with the user terminal in the user terminal.

Further, the receiving of the design may include: when the user terminal and the smart garment are paired, receiving, at the user terminal, identification information transmitted from the smart garment; transmitting, at the user terminal, the received identification information to the server; and receiving, at the user terminal, a design of a smart garment transmitted from the server corresponding to the identification information.

A smart garment according to the disclosed embodiments can change a design element, such as a color, an image, or text, so that a user can change a design of the smart garment to a desired design, regardless of time and place.

BRIEF DESCRIPTION OF THE DRAWINGS

FIG. 1 is a conceptual view of a system according to one illustrated embodiment.

FIGS. 2 and 3 are diagrams illustrating a configuration of a smart garment according to one illustrated embodiment.

FIG. 4 is a flowchart illustrating a method of changing a design of the smart garment of a system according to the disclosed embodiment.

FIG. 5 is a diagram illustrating a user interface for changing a design of the smart garment according to the disclosed embodiment.

FIG. 6 is a flowchart illustrating a method of changing a design of a smart garment of a system according to another disclosed embodiment.

FIGS. 7 and 8 are diagrams illustrating a user interface for searching for and pairing with the smart garment displayed on a user terminal according to the disclosed embodiment.

FIG. 9 is a diagram illustrating a user interface for changing a design of the smart garment according to another embodiment.

FIG. 10 is a flowchart illustrating a method of changing a design of a smart garment of a system according to still another disclosed embodiment, and FIGS.

FIGS. 11 to 16 are diagrams illustrating a user interface for changing a design of the smart garment according to still another disclosed embodiment.

FIGS. 17a to 20e are diagrams illustrating cholesteric liquid crystal fibers among the color-changing fibers of the smart garment according to the disclosed embodiment.

FIGS. 21a, 21b, 22a and 22b illustrate a connection structure of the color-changing fiber and the fabric of the smart garment according to the disclosed embodiment.

FIGS. 23a and 23b are diagrams illustrating a structure of the fabric of the smart garment according to the disclosed embodiment.

FIG. 24 is a diagram illustrating a connection relationship of color-changing fibers and the connection module for control of the color-changing fibers of the smart garment according to the disclosed embodiment.

FIG. 25 is a diagram illustrating electronic ink fibers among the color-changing fibers of the smart garment according to the disclosed embodiment.

FIG. 26 is a diagram illustrating an electrochromic fiber among color-changing fibers of the smart garment according to the disclosed embodiment.

FIGS. 27a, 27b, 27c, and 27d are diagrams illustrating electroluminescent fibers among color-changing fibers of the smart garment according to the disclosed embodiment.

DETAILED DESCRIPTION

Hereinafter, disclosed embodiments will be described in detail with reference to the accompanying drawings.

FIG. 1 is a conceptual view of a system 10 according to one illustrated embodiment, and FIGS. 2 and 3 are diagrams illustrating a configuration of a smart garment 400 according to one illustrated embodiment.

Referring to FIG. 1, the system 10 according to the illustrated embodiment includes the smart garment 400, a provider terminal 100 configured to upload a design implementable on the smart garment 400 to a server 200, the server 200 configured to store the design uploaded by the provider terminal 100, and a user terminal 300 configured to download the design implementable on the smart garment 400 from the server 200 and transmit the design to the smart garment 400.

The design of the smart garment 400 refers to a color, an image, text, or a combination thereof, which is displayable on the smart garment 400.

A provider of the smart garment 400, such as a seller or a business operator of the smart garment 400, may upload the design implementable on the smart garment 400 to the server 200 using the provider terminal 100. In addition to the above-described garment provider, a separate design provider or purchaser may freely upload a design of the smart garment 400 to the server 200.

The provider terminal 100 may include a computer capable of communicating with the server 200 or a mobile device such as a smart phone or a tablet personal computer (PC). The devices are merely examples of the provider terminal 100, and any device may be included in the range of the provider terminal 100 as long as the device is capable of communicating with the server 200.

The provider of the smart garment 400 uploads identification information of the smart garment 400 on which the uploaded design can be implemented, for example, a product number, a trademark, a size, a material, and the like, when the design is uploaded to the server 200 so that a design that can be implemented on the smart garment 400 possessed by the purchaser can be easily retrieved.

The server 200 stores designs of the smart garment 400 uploaded from various provider terminals 100 to build a database. The server 200 may classify and store designs by providers who have uploaded the designs and classify and store designs uploaded by the same provider according to the type of smart garment 400. A user may access the server 200 through the user terminal 300 and download the design from the server 200 after undergoing a predetermined authentication process.

When the user inputs the identification information of the smart garment 400, for example, the product number, the trademark, the size, the material, and the like, through the user terminal 300 after undergoing the authentication process, the user may download a design of the smart garment 400 associated with the input identification information from the server 200 to the user terminal 300.

The user terminal 300 may include a computer capable of communicating with the server 200 or a mobile device such as a smart phone or a tablet PC. The devices are merely examples of the user terminal 300, and any device may be included in the range of the user terminal 300 as long as the device is capable of communicating with the server 200. More specifically, the user terminal may include a communicator capable of communicating with the server or the smart garment, a display configured to display a user interface for changing a design of the smart garment, and a processor configured to generate a signal including a design of the smart garment and transmit the signal to the smart garment through the communicator when the design of the smart garment displayed on the display is selected.

The user terminal 300 may serve as the provider terminal 100 when the design of the smart garment 400 is uploaded to the server 200 through the user terminal 300, and even the provider terminal 100 may serve as the user terminal 300 when the provider terminal 100 downloads the design of the smart garment from the server 200.

The user terminal 300 transmits design information selected by the user from the design downloaded from the server 200 or a previously stored design to the smart garment 400.

The smart garment 400 includes a connection module 420 that may receive the design information transmitted from the user terminal 300 and change the design of the smart garment 400 based on the received information.

As shown in FIG. 1, when the connection module 420 of the smart garment 400 receives the signal including design information transmitted from the user terminal 300, the smart garment 400 changes a color, displays or changes text, or displays or changes a pattern according to the received signal. That is, the user may implement various designs on one smart garment 400.

The connection module 420 of the smart garment 400 will be first described in detail with reference to FIGS. 2 and 3, and a method of changing a design of the smart garment 400 and a user interface of the user terminal for changing a design of the smart garment 400 in the system according to one disclosed embodiment will be described in detail with reference to FIGS. 4 to 16.

Referring to FIG. 2, the smart garment 400 includes the connection module 420 configured to receive a signal transmitted from the user terminal 300. The connection module 420 may be provided at any position on the smart garment 400. However, it is preferable for the connection module 420 to be provided at an edge of the garment which is easily connected to the user terminal 300 through a wired connection when considering the case of connecting to the user terminal 300 by wire.

As shown in FIG. 2, the connection module 420 may include a communicator 427 configured to perform wired/wireless communication with the user terminal 300, a processor 423 configured to generate a control signal for changing a design of the smart garment 400 according to a signal received by the communicator 427, a driver 421 configured to apply a voltage to the smart garment 400 according to the control signal generated by the processor 423, a memory 425 configured to store design information included in the signal received by the communicator 427 or information related to a current design of the smart garment 400, and a battery configured to supply power to the smart garment 400.

The communicator 427 of the connection module 420 is connected to the user terminal 300 through a communication scheme, such as a wireless local area network (LAN), Wi-Fi, Bluetooth, ZigBee, an ultra-wideband (UWB), infrared data association (IrDA), Bluetooth low energy (BLE), near field communication (NFC), and the like.

The driver 421 is connected to electrodes of color-changing fibers constituting the smart garment 400, which will be described below, and applies a voltage to the electrodes according to the signal generated by the processor 423 so that the design of the smart garment 400 is changed. Only one driver 421 may be provided or a plurality of drivers 421 may be provided.

The memory 425 may include not only a volatile memory, such as a static random access memory (S-RAM), a dynamic RAM (D-RAM), and the like, but also a flash memory, such as a flash memory, a read only memory (ROM), an erasable programmable read only memory (EPROM), an electrically erasable programmable read only memory (EEPROM), and the like.

As shown in FIG. 2, the connection module 420 may include all or at least one of the communicator 427, the processor 423, the driver 421, and the battery 429.

For example, the connection module 420 may include the communicator 427 and the driver 421. In this case, the communicator 427 may receive the control signal generated by the processor of the user terminal 300, and the driver 421 may change the design of the smart garment 400 by applying a voltage to the smart garment 400 according to the control signal received by the communicator 427.

Alternatively, the connection module 420 may include the communicator 427, the processor 423, and the driver 421. In this case, when the communicator 427 receives the signal including the design information transmitted from the user terminal 300, the processor 423 generates the control signal for controlling the driver 421 according to the signal received by the communicator 427 and outputs the control signal to the driver 421. The driver 421 may change the design of the smart garment 400 by applying a voltage to the smart garment 400 according to the control signal output from the processor 423 of the connection module 420.

Alternatively, the connection module may include the communicator 427, the processor 423, the driver 421, and the memory 425. In this case, when the communicator 427 receives the signal including the design information transmitted from the user terminal 300, the memory 425 stores the design information included in the signal received by the communicator 427. Also, the memory 425 may store information related to a current design of the smart garment 400. In addition, the processor 423 generates the control signal for controlling the driver 421 according to the signal received by the communicator 427 and outputs the control signal to the driver 421. The driver 421 may change the design of the smart garment 400 by applying the voltage to the smart garment 400 according to the control signal output from the processor 423.

Alternatively, the connection module 420 may include the communicator 427, the processor 423, the driver 421, the memory 425, and the battery 429. When light emitting diodes are used as the color-changing fibers constituting the smart garment 400, the battery 429 may be needed to supply power to the light emitting didoes. In addition, when cholesteric liquid crystals, electronic ink, or electrochromic devices having bistability are used as fabrics constituting the smart garment 400, the battery 429 may be omitted. Descriptions of the remaining configurations are the same as the above descriptions, and thus will be omitted.

Alternatively, as shown in FIG. 3, the connection module 420 of the smart garment 400 according to the disclosed embodiment may include only a connector 428 provided to be connected to the user terminal 300 by a wire. When the user terminal 300 and the smart garment 400 are connected by the connector 428, the processor of the user terminal 300 may generate a signal for implementing a design selected by the user on the smart garment 400, and the driver 421 of the user terminal 300 may apply a voltage for controlling the smart garment 400 through the connector 428 according to the signal generated by the processor 423. When the signal for controlling the smart garment 400 is applied from the user terminal 300 through the connector 428, the smart garment 400 may be changed to the design selected by the user.

Meanwhile, FIG. 4 is a flowchart illustrating a method of changing a design of the smart garment 400 of a system according to the disclosed embodiment, and FIG. 5 is a diagram illustrating a user interface for changing a design of the smart garment 400 according to the disclosed embodiment.

An application for changing a design of the smart garment 400 may be installed in the user terminal 300. The application may provide a user interface related to pairing the smart garment 400 with the user terminal 300, changing a design of the smart garment 400, and the like through a display of the user terminal 300.

Referring to FIG. 4, when the application of the user terminal 300 is executed, the user terminal 300 searches for a nearby smart garment 400. The application may be executed by a command of a user, or may be automatically executed when the nearby smart garment 400 is sensed. An autorun function of the application may be changed through settings of the application.

The user terminal 300 searches for the smart garment 400 and transmits a signal to the nearby smart garment 400 to be paired with the smart garment 400. When the nearby smart garment 400 receives the signal transmitted from the user terminal 300 and transmits a signal in response to the received transmitted signal to the user terminal 300, the user terminal 300 and the smart garment 400 are paired. As described above, the pairing of the smart garment 400 and the user terminal 300 may be performed through a communication scheme, such as a LAN, Wi-Fi, Bluetooth, ZigBee, a UWB, IrDA, BLE, NFC, and the like.

FIGS. 4 and 5 illustrate a case in which one smart garment 400 is found. A case in which a plurality of nearby smart garments 400 are found will be described below, and searching and pairing of the smart garment 400 will be described below in detail. As shown in FIGS. 4 and 5, when there is one nearby smart garment 400, the user interface shown in FIG. 5 is displayed on the display of the user terminal 300 once the user terminal 300 and the smart garment 400 are paired.

The user interface may include a garment display area 310 at an upper portion thereof where an image of the paired smart garment 400 is displayed, a color selection area 320 displayed below the garment display area 310 and provided to allow a color of the smart garment 400 displayed in the garment display area 310 to be selected, an image selection area 330 displayed below the color selection area 320 and provided to allow an image to be implemented on the smart garment 400 displayed in the garment display area 310 to be selected, and a text input area 340 provided below the image selection area 330 and provided to allow text to be displayed on the smart garment 400 displayed in the garment display area 310 to be input. Positions of the garment display area 310, the color selection area 320, the image selection area 330, and the text input area 340 are not limited to the above-described positions, and may be variously set. For example, the user may change the positions as desired through application settings. The user may select a desired color or image or may input text through the user interface, and the user terminal 300 transmits a signal including information selected or input through the user interface to the smart garment 400 so that the design of the smart garment 400 can be changed. The connection module 420 of the smart garment 400 according to the present embodiment may include at least the connector 428, as shown in FIG. 3, or at least the communicator 427 and the driver 421 among the configuration shown in FIG. 2.

The image of the smart garment 400 displayed in the garment display area 310 may be a representative image set as a default in association with the paired smart garment 400. For example, when the paired smart garment 400 is a short-sleeved t-shirt, a representative image that does not reflect a shape or the like of the paired short-sleeved t-shirt and is designed to allow the user to intuitively recognize that the smart garment is a short-sleeved t-shirt may be displayed in the garment display area 310. According to another embodiment, an image similar to the actual smart garment 400 reflecting a current design of the smart garment 400 may be displayed in the garment display area 310, which will be described below with reference to FIG. 6.

The color selection area 320 may be displayed in various colors in a matrix form, as shown in FIG. 5. The user may change the color of the smart garment 400 by touching a desired color among the colors displayed in the color selection area 320 or by selecting the color through a separate inputter, such as a keyboard or a mouse. Once the color is selected, the changed color may be reflected in the image of the smart garment 400 displayed in the garment display area 310. A manner in which colors are displayed in the color selection area 320 is not limited to the above-described example, and may be variously set. The user may change a display format of the colors through the application setting, and may set frequently used colors to be preferentially displayed.

The image selection area 330 may display images including a pattern or design stored in advance in the user terminal 300 in association with the paired smart garment 400, as shown in FIG. 5. Like the image selection area 330 or the color selection area 320, various images may be displayed in a matrix form. The user may change the image implemented on the smart garment 400 by touching a desired image among the images displayed in the image selection area 330, or by selecting the image through a separate inputter, such as a keyboard or a mouse. Once the image is selected, the changed image may be reflected in the image of the smart garment 400 displayed in the garment display area 310.

As described above, in addition to the images stored in advance in the user terminal 300 in association with the paired smart garment 400, images, such as photographs stored in the user terminal 300, may also be displayed in the image selection area 330. In addition, an object for driving a camera may also be displayed to display an image directly captured by the camera of the user terminal 300 on the smart garment 400. That is, when the user touches the object or clicks the object through an inputter, the camera installed in the user terminal 300 is driven so that the user can acquire a desired image by camera capturing. When camera capturing is performed, the captured image may be displayed on the smart garment 400 displayed in the garment display area 310. The user may select an image displayed in the image selection area 330 through application settings. That is, only the images stored in advance in the user terminal 300 in association with the paired smart garment 400 may be set to be displayed, or only images such as photos stored in the user terminal 300 may be displayed. In addition, only the object for driving the camera may be set to be displayed so that the image directly captured by the camera of the user terminal 300 can be displayed on the smart garment 400.

In the text input area 340, a representation, such as <text input>, for allowing the user to know that a corresponding area is provided for text input may be displayed. Alternatively, the text input area 340 may be displayed as a blank space without a separate guide. When the user touches the text input area 340 or clicks it through a separate inputter, the user terminal 300 displays a keyboard for text input to enable the user to input desired text. A detailed description thereof will be given below. Text may be input through the keyboard or may be input via voice. The user may input text through the keyboard or input text via voice by application settings. An icon for guiding a keyboard input of text and an icon for guiding a voice input of text may be displayed in the text input area 340 so that the user can select a desired text input method by touching or clicking the icon for guiding the desired text input method.

When text is input to the text input area 340, the input text may be displayed on the smart garment 400 displayed in the garment display area 310.

FIG. 6 is a flowchart illustrating a method of changing a design of a smart garment 400 of a system according to another disclosed embodiment, FIGS. 7 and 8 are diagrams illustrating a user interface for searching for and pairing with the smart garment 400 displayed on a user terminal 300 according to the disclosed embodiment, and FIG. 9 is a diagram illustrating a user interface for changing a design of the smart garment 400 according to another embodiment.

Referring to FIG. 6, when an application of the user terminal 300 is executed, the user terminal 300 searches for a nearby smart garment 400. The application may be executed by a command of a user, or may be automatically executed when the nearby smart garment 400 is sensed. An autorun function of the application may be changed through settings of the application.

The user terminal 300 searches for the smart garment 400 and transmits a signal to the nearby smart garment 400 to be paired with the smart garment 400. When the nearby smart garment 400 receives the signal transmitted from the user terminal 300 and transmits a signal in response to the received transmitted signal to the user terminal 300, the user terminal 300 and the smart garment 400 are paired.

As shown in FIGS. 7 and 8, the user terminal 300 may provide the user interface for searching for the smart garment 400 and pairing with the found smart garment 400. As shown in FIG. 7, the user interface may display a garment display area 311, a search button for searching for the nearby smart garment 400 below the garment display area 311, and a pairing button 314 for pairing with the found smart garment 400 in a display of the user terminal 300. Positions of the garment display area 311, the search button 312, and the pairing button 314 are not limited to the above-described positions, and may be variously set. For example, the user may change the positions as desired through application settings.

When the user touches or clicks the search button 312 to search for the nearby smart garment 400, as shown in FIG. 7, an image of a magnifying glass may be displayed in the garment display area 311 so that the user can intuitively recognize that the nearby smart garment 400 is being searched for.

When the nearby smart garment 400 is found, images of the found smart garments 400 may be displayed in a matrix form in the garment display area 311, as shown in FIG. 8. The user may select the smart garment 400 desired to be paired with among the smart garments 400 displayed in the garment display area 311 by touching or clicking the desired smart garment 400, and may pair the selected smart garment 400 with the user terminal 300 by touching or clicking the pairing button 314.

As shown in FIG. 6, when the smart garment 400 and the user terminal 300 are paired, the smart garment 400 extracts a current color thereof and a current image or text implemented on the smart garment 400 and transmits them to the user terminal 300. The connection module 420 of the smart garment 400 according to the present embodiment may include at least the communicator 427, the processor 423, the driver 421, and the memory 425, and design information of the current smart garment 400 may be stored in the memory 425.

The user terminal 300 may display an image similar to the actual smart garment 400 reflecting the current design of the paired smart garment 400 or the like in the garment display area 310 on the basis of information transmitted from the smart garment 400. For example, as shown in FIG. 9, the user terminal 300 may display an image including a color of the paired smart garment 400 and a pattern or design implemented on the smart garment 400, or, when text is implemented, an image reflecting the text in the garment display area 310. A description of the other user interface shown in FIG. 9 is the same as that shown in FIG. 5, and thus will be omitted.

The user may select a desired color or image or input text through the user interface, and the user terminal 300 may transmit a signal including the information selected or input through the user interface to the smart garment 400 so that the design of the smart garment 400 can be changed.

FIG. 10 is a flowchart illustrating a method of changing a design of a smart garment 400 of a system according to still another disclosed embodiment, and FIGS. 11 to 16 are diagrams illustrating a user interface for changing a design of the smart garment 400 according to still another disclosed embodiment.

Referring to FIG. 10, when an application of the user terminal 300 is executed, the user terminal 300 searches for a nearby smart garment 400. The application may be executed by a command of a user, or may be automatically executed when the nearby smart garment 400 is sensed. An autorun function of the application may be changed through settings of the application.

The user terminal 300 searches for the smart garment 400 and transmits a signal to the nearby smart garment 400 to be paired with the smart garment 400. When the nearby smart garment 400 receives the signal transmitted from the user terminal 300 and transmits a signal in response to the received transmitted signal to the user terminal 300, the user terminal 300 and the smart garment 400 are paired.

A description of paring of the user terminal 300 and the smart garment 400 is the same as the description of FIGS. 6 to 8, and thus will be omitted.

When the connection module 420 of the smart garment 400 is paired with the user terminal 300, the connection module 420 transmits identification information of the smart garment 400 to the user terminal 300 and the user terminal 300 transmits the identification information of the smart garment 400 transmitted from the smart garment 400 to the server 200. The connection module 420 of the smart garment 400 according to the present embodiment may include at least the communicator 427, the processor 423, the driver 421, and the memory 425, and design information or identification information of the current smart garment 400 may be stored in the memory 425.

The server 200 searches for a design of the smart garment 400 represented by the identification information on the basis of the identification information of the smart garment 400 transmitted from the user terminal 300 and transmits found design information to the user terminal 300. The user terminal 300 downloads the design of the paired smart garment 400 from the server 200 and displays the downloaded design in the color selection area 320 and the image selection area 330 of the user interface shown in FIG. 11. Text implementable on the smart garment 400 may also be displayed as an image in the image selection area 330.

The user may select a desired color or image or input text through the user interface, and the user terminal 300 may transmit a signal including the information selected or input through the user interface to the smart garment 400 so that the design of the smart garment 400 can be changed.

A method of changing a design of the paired smart garment 400 through the user interface provided by the user terminal 300 will be described in detail with reference to FIGS. 11 to 15.

As shown in FIGS. 11 and 12, a user interface of the user terminal 300 is similar to the user interface shown in FIG. 5. The user interface shown in FIGS. 11 and 12 is different from the user interface shown in FIG. 5 in that an interface for changing the smart garment 400 displayed in the garment display area 310 to another found smart garment 400 and an interface 315 provided for a user to recognize that the smart garment 400 displayed in the garment display area 310 is a paired garment when the smart garment 400 is paired with the user terminal 300 are further displayed in the garment display area 310.

When the user intends to change the smart garment 400 displayed in the garment display area 310 to another found smart garment 400, as shown in FIG. 12, the user may touch or click the interface for changing the smart garment 400. Alternatively, the user may input a drag gesture or a flick gesture among touch gestures to the garment display area 310 to change the smart garment 400 displayed in the garment display area 310 to another smart garment 400.

When the smart garment 400 displayed in the garment display area 310 is changed, the color selection area 320, the image selection area 330, and the text input area 340 are changed to suit the changed smart garment 400. For example, when the changed smart garment 400 does not support text input, a representation that conveys a meaning that text input is not possible, for example, <none>, is displayed in the text input area 340, as shown in FIG. 12.

Also, as shown in FIG. 12, when the changed smart garment 400 is a smart garment that is not paired with the user terminal 300, the user terminal 300 does not display the interface indicating the pairing. In addition, when the smart garment 400 displayed in the garment display area 310 is changed to the paired smart garment 400, the user terminal 300 displays an interface indicating that the displayed smart garment 400 is paired with the user terminal 300.

Meanwhile, when the user intends to implement an image on the paired smart garment 400 or change an existing image, the user may change the image of the smart garment 400 by touching or clicking the image, pattern, or design displayed in the image selection area 330. As shown in FIG. 13, an object for selecting photographs stored in the user terminal 300 may be displayed in the image selection area 330 in addition to the images transmitted from the server 200.

As shown in FIG. 13, when an object allowing for connection to the images stored in the user terminal 300 is touched or clicked, the images stored in the user terminal 300 may be displayed in a matrix form below the garment display area. In addition, an area 316 in which an image can be displayed is displayed in a rectangular shape on the smart garment 400 displayed in the garment display area 310 so that the user can recognize where the image selected by the user is displayed on the smart garment 400. The user may change a shape, size, or position of the area displayed on the smart garment 400 in the garment display area 310.

As shown in FIG. 13, when an image representing a flower is selected through a touch or click, the selected image is displayed on the smart garment 400 displayed in the garment display area 310. In addition, the user terminal 300 transmits a signal including information for implementing the selected image on the smart garment 400 to the smart garment 400 so that the selected image is displayed on the smart garment 400. As shown in FIG. 13, when the image is selected, the user terminal 300 may directly forward the signal for implementing the image to the smart garment 400, or may display a message requesting confirmation of the application of the selected image and forward the signal for implementing the image to the smart garment 400 when a confirmation command is input.

In addition, as shown in FIG. 14, an object for driving the camera may also be displayed in the image selection area 330 so that an image directly captured by the camera of the user terminal 300 can be displayed on the smart garment 400.

As shown in FIG. 14, when the object for driving the camera of the user terminal 300 is touched or clicked, a camera installed in the user terminal 300 is driven so that the user can acquire a desired image through camera capturing. Once camera capturing is performed, a captured image may be displayed on the smart garment 400 displayed in the garment display area 310. The user may adjust a position or size of the captured image by changing a shape, size, or position of the image display area displayed on the smart garment 400. When the above adjustment is complete, the user terminal 300 transmits a signal including information for implementing the captured image on the smart garment 400 to the smart garment 400 so that the captured image is displayed on the smart garment 400. As shown in FIG. 16, when an image is captured and adjustment of a size or position of the image is complete, the user terminal 300' may directly forward a signal for implementing the captured image on the smart garment 400, or may display a message requesting confirmation of application of the captured image and then forward the signal for implementing the image to the smart garment 400 when a confirmation command is received.

Meanwhile, the user may input text through the text input area 340 when the user intends to display text on the paired smart garment 400 or change existing text.

As shown in FIG. 15, in the text input area 340, a representation, such as <text input>, may be displayed that allows the user to know that a corresponding area is provided for text input. Alternatively, the text input area 340 may be displayed as a blank space without a separate guide.

When the user touches the text input area 340 or clicks the text input area 340 through a separate inputter, the user terminal 300 displays an area provided for selecting a color of text and a keyboard for inputting text, as shown in FIG. 15, so that the user can input text of a desired color. In addition, an area 341 in which text can be displayed is displayed in a rectangular shape on the smart garment 400 displayed in the garment display area 310 so that the user can recognize where the image selected by the user is displayed on the smart garment 400. The user may change a shape, size, or position of the text display area displayed on the smart garment 400 in the garment display area 310.

In addition, although not illustrated in the drawings, a user interface for selecting a text font may be further displayed to allow the user to select a desired font.

When text is input and a color and font of the input text are selected, the input text is displayed on the smart garment 400 displayed in the garment display area 310. Also, the user terminal 300 transmits a signal including information for implementing the input text on the smart garment 400 to the smart garment 400 so that the input text can be displayed on the smart garment 400. As shown in FIG. 15, when text is input, the user terminal 300 may directly forward a signal for displaying the text to the smart garment 400, or may display a message requesting confirmation of application of the input text and then forward the signal for displaying the text to the smart garment 400 when a confirmation command is input.

Further, the text may be input through a keyboard or input via voice. The user may input text through the keyboard or via voice by application settings. An icon for guiding keyboard input of text and an icon for guiding voice input of text may be displayed in the text input area 340 so that the user can select a desired text input method by touching or clicking the icon for guiding the desired text input method. When the icon for guiding keyboard input is selected, the user interface shown in FIG. 15 may be displayed.

When text is input to the text input area 341, the input text may be displayed on the smart garment 400 displayed in the garment display area 310.

As described above, the design of the smart garment 400 may be changed through the user interface provided by the user terminal 300, or the user terminal 300 may sense information of the surrounding environment and automatically change the design of the smart garment 400, which will be described with reference to FIG. 16.

As shown in FIG. 16, the user terminal 300 may recognize a position of the user terminal 300 or detect a surrounding temperature or weather using a sensor mounted on the user terminal 300 or by utilizing Internet information or the like. The position, temperature, and weather are examples of environment information that the user terminal 300 can detect, but the present invention is not limited thereto.

For example, when a current position recognized by the user terminal 300 is a baseball field, the user terminal 300 may transmit a signal to the smart garment 400 such that a symbol of a team playing a game at the baseball field can be implemented on the smart garment 400. The smart garment 400 may display the symbol of the team according to the signal transmitted from the user terminal 300.

When a current temperature sensed by the user terminal 300 is more than 30° C., the user terminal 300 may transmit a signal for changing a color of the current smart garment 400 to white to the smart garment 400. The smart garment 400 may change the color thereof to white according to the signal transmitted from the user terminal 300. When the color of the current smart garment 400 is already white, the smart garment 400 may not change the color.

In addition, when a current weather detected by the user terminal 300 is rainy weather, the user terminal 300 may transmit a signal for changing a pattern, a design, or an image currently displayed on the smart garment 400 to a raindrop image, design, or pattern to the smart garment 400. The smart garment 400 may change the current pattern, design, or image thereof to the raindrop pattern, design, or image according to the signal transmitted from the user terminal 300.

An application may provide a surrounding environment recognition mode that provides the above-described functions, and the user may activate the surrounding environment recognition mode to automatically cause the user terminal 300 to change the design of the smart garment 400. Alternatively, the surrounding environment recognition mode may be usually turned off and optionally activated in a desired situation.

Meanwhile, the smart garment 400 according to the disclosed embodiment includes a fabric including color-changing fibers and ordinary fibers, which are materials for changing an image, text, or color according to a signal transmitted from the user terminal 300, and the above-described connection module 420. Hereinafter, the color-changing fibers constituting the smart garment 400 will be described in detail.

FIGS. 17 to 20 are diagrams illustrating cholesteric liquid crystal fibers among the color-changing fibers of the smart garment 400 according to the disclosed embodiment.

As shown in FIG. 17A, cholesteric liquid crystal fiber 419 may have a circular or polygonal cross-section. As shown in FIG. 17A, the cholesteric liquid crystal fiber has a cholesteric liquid crystal 415 provided at the center of the fiber, a first electrode 412a formed on a part of an outer surface of the cholesteric liquid crystal, a second electrode 412b formed at an opposite surface of the first electrode, an insulator 413 provided between the first electrode and the second electrode, and a protective layer 411 covering the first electrode, the second electrode, and the insulator.

Cholesteric liquid crystals have bistability such that the cholesteric liquid crystals may be present in two stable states, such as a planar state in which light is reflected even when no voltage is applied to the cholesteric liquid crystals and a focal conic state in which light is scattered. The cholesteric liquid crystals may be converted into a homeotropic state in which light can be transmitted when a high voltage is applied thereto. Thus, when the design of the smart garment 400 is changed by the user terminal 300, the changed design may be maintained without the application of voltage.

An inner electrode and an outer electrode may be transparent electrodes made of a transparent conductive material, and examples of the transparent conductive material may include indium tin oxide (ITO), indium zinc oxide (IZO), aluminum-doped zinc oxide (ZAO), a silver nano-wire (AgNW), and the like.

The protective layer covering the first electrode, the second electrode, and the insulator may be formed by coating ordinary textile fibers or fibers in a mesh form. By using ordinary textile fibers as the protective layer, a texture of ordinary textile fibers may be imparted to the cholesteric liquid crystal fiber. The first electrode and the second electrode may be connected to the driver 421 of the connection module 420, and the driver 421 may change the design of the smart garment 400 by applying a voltage to the first electrode and the second electrode according to a control signal of the processor 423.

As shown in FIG. 17B, the cholesteric liquid crystal fiber may include a partition wall 416 for maintaining a shape of the fiber in the cholesteric liquid crystals. The partition wall may be formed by a polymer structure. In addition, as shown in FIG. 17C, the cholesteric liquid crystal fiber may be provided to have a polygonal cross-section, such as a quadrangular cross-section.

As shown in FIG. 18, the above-described cholesteric liquid crystal fiber may be combined with an ordinary textile fiber 490 to form a color-changing fiber constituting the smart garment 400. As shown in FIG. 18, the cholesteric liquid crystal fiber and the ordinary textile fiber may be formed to have a twisted structure. A fabric of the smart garment 400 according to the disclosed embodiment may be formed by weaving color-changing fibers having a twisted form of cholesteric liquid crystal fibers and textile fibers.

In the case of the fabric woven with the color-changing fibers of the structure shown in FIG. 18, the above-described first electrode and second electrode may not be formed on the cholesteric liquid crystal fiber, but the first electrode and the second electrode may be formed on one surface of the woven fabric and an opposite surface thereof.

In another embodiment, as shown in FIG. 19, the fabric of the smart garment 400 may be formed by weaving the cholesteric liquid crystal fibers 430 and the ordinary textile fibers 422 in the form of a net. According to the present embodiment, unlike the embodiment shown in FIG. 18, the fabric is formed by weaving the cholesteric liquid crystal fibers and the textile fibers in the form of a net without weaving the fabric using color-changing fibers having a twisted structure of cholesteric liquid crystal fibers and textile fibers.

FIG. 20A illustrates a structure of pixels P of a cholesteric liquid crystal fiber according to the disclosed embodiment. Referring to FIG. 20A, the cholesteric liquid crystal fiber may have a structure in which red pixels reflecting one color of light, for example, red light, are arranged in a single layer. In this case, since one cholesteric liquid crystal fiber reflects one color, cholesteric liquid crystal fibers arranged in adjacent columns or in adjacent rows in the form shown in FIG. 19 may be provided to reflect different colors.

Alternatively, as shown in FIG. 20B, one pixel P constituting the cholesteric liquid crystal fiber may have a structure in which a red sub-cell 431 reflecting a wavelength band corresponding to red light, a green sub-cell 432 reflecting a wavelength band corresponding to green light, and a blue sub-cell 433 reflecting a wavelength band corresponding to blue light are stacked atop one another.

As shown in FIG. 20B, one pixel may have a stacked structure, or, as shown in FIGS. 20C and 20D, one pixel may have a structure in which a red sub-cell reflecting a wavelength band corresponding to red light, a green sub-cell reflecting a wavelength band corresponding to green light, and a blue sub-cell reflecting a wavelength band corresponding to blue light are arranged in a single layer.

As shown in FIGS. 20C and 20D, a grid 434 that separates each of sub-cells constituting one pixel may be implemented by an ordinary textile fiber material so that cholesteric liquid crystal fibers may have a texture of textile fibers. The grid may be formed to have a height higher than the cholesteric liquid crystals, as shown in FIG. 20C, or may be formed at the same height as the cholesteric liquid crystals, as shown in FIG. 20D.

As shown in FIG. 20E, even when one pixel has a stacked structure, a grid separating each sub-cell may be implemented by an ordinary textile fiber material so that cholesteric liquid crystal fibers may have a texture of textile fibers.

Meanwhile, when the smart garment 400, for example, a T-shirt, is made, it is necessary to connect fabrics of a sleeve portion and a body portion. This connection may be made at a cholesteric liquid crystal fiber level or at a fabric level formed by cholesteric liquid crystal fibers. FIGS. 21 and 22 illustrate a connection structure of the color-changing fiber and the fabric of the smart garment 400 according to the disclosed embodiment.

Referring to FIG. 21A, since the cholesteric liquid crystal fiber includes the first electrode and the second electrode to which a voltage is applied, as described above, when cholesteric liquid crystal fibers 419 are connected to each other, electrodes of the same polarity should be electrically connected. That is, first electrodes of the cholesteric liquid crystal fibers to be connected should be electrically connected to each other, and second electrodes should be electrically connected to each other. As shown in FIG. 21B, a connection portion 440 of the cholesteric liquid crystal fiber may include a first connection electrode 440*a* which electrically connects the first electrodes 412*a* of the cholesteric liquid crystal fibers, a second connection electrode 440*b* which electrically connects the second electrodes 412*b* of the cholesteric liquid crystal fibers, and an insulator provided between the first connection electrode and the second connection electrode. Additionally, an outer protective layer which may protect the connection portion may further included. A cross-section of the connection portion may be formed to be circular when a cross-section of the cholesteric liquid crystal fiber is circular, and the cross-section of the connection portion may be formed to be polygonal corresponding to the cross-section of the cholesteric liquid crystal fiber when the cross-section of the cholesteric liquid crystal fiber is polygonal.

In the case of the fabric woven with the color-changing fibers having a twisted structure shown in FIG. 18, the first electrode and the second electrode are formed in the woven fabric, as described above. In this case, as shown in FIG. 22A, first electrodes of fabrics 450 to be connected should be electrically connected to each other, and second electrodes should be electrically connected to each other. As shown in FIG. 22A, a connection portion 455 of the fabric may include a first connection electrode 455*a* which connects the first electrodes 450*a* formed on top surfaces of the fabrics to be connected and a second connection electrode 455b which connects the second electrodes 450b formed on bottom surfaces of the fabrics to be connected. FIG. 22A illustrates a cross-section of the fabrics to be connected and the connection portion which connects the fabrics, and FIG. 22B illustrates the top surface. In FIG. 22B, outer electrodes illustrated by solid lines are the first connection electrodes and outer electrodes illustrated by dotted lines are the second connection electrodes.

As described above, the fabric of the smart garment 400 may be formed using the color-changing fibers having the twisted structure shown in FIG. 18, or may be formed by weaving cholesteric liquid crystal fibers and ordinary textile fibers in the form of a net as shown in FIG. 19. As another method, as shown in FIGS. 23A and 23B, a flexible cholesteric liquid crystal in the form of a film may be used. FIG. 23A is a diagram illustrating a structure of the fabric of the smart garment 400 according to the disclosed embodiment.

As shown in FIG. 23A, the flexible cholesteric liquid crystal 460 may be formed into a net shape by forming holes in the form of a matrix in the flexible cholesteric liquid crystal and inserting an ordinary textile fiber 455 into a net eye, i.e., the hole, such that the fabric of the smart garment 400 is formed. Alternatively, as shown in FIG. 23B, textile fibers may be formed into a net shape by forming holes in the form of a matrix in the ordinary textile fibers and combining the flexible cholesteric liquid crystal 460 into a net eye, i.e., the hole, such that the fabric of the smart garment 400 is formed.

The cholesteric liquid crystal illustrated in FIGS. 23A and 23B may include pixels of a stacked structure or pixels of a single layer structure, as described above. The cholesteric liquid crystals of FIG. 23A may be individually controlled for each line, and the cholesteric liquid crystals of FIG. 23B may also be individually controlled for each cholesteric liquid crystal forming the net eye.

FIG. 24 is a diagram illustrating a connection relationship of color-changing fibers and the connection module 420 for control of the color-changing fibers of the smart garment 400 according to the disclosed embodiment. As shown in FIG. 24, one of a first electrode 430a-1 and a second electrode 430a-2 of a cholesteric liquid crystal fiber 430a as a first material and a cholesteric liquid crystal fiber 430b as a second material that constitute a fabric may perform a role of a signal electrode, and the other may perform a role of a ground electrode. In the same manner, one of a third electrode 430b-1 and a fourth electrode 430b-2 may perform a role of a signal electrode, and the other may perform a role of a ground electrode. Since both the first material and the second material are cholesteric liquid crystal fibers, which are color-changing fibers, and the first electrode, the second electrode, the third electrode, and the fourth electrode perform the same function, the first electrode and the second electrode will be described as an example. For example, when the first electrode is the signal electrode and the second electrode is the ground electrode, the first electrodes of the cholesteric liquid crystal fibers are electrically connected to a signal terminal of the driver 421 of the connection module 420, and the second electrodes are electrically connected to a ground terminal of the driver 421 of the connection module 420. All the cholesteric liquid crystal fibers may be connected to one connection module 420, or the cholesteric liquid crystal fibers may be controlled using a plurality of connection modules 420.

The cholesteric liquid crystal fiber has been described above as an example of the color-changing fiber for changing a design of the smart garment 400. Hereinafter, other embodiments of the color-changing fiber will be described.

FIG. 25 is a diagram illustrating electronic ink fibers among the color-changing fibers of the smart garment 400 according to the disclosed embodiment.

As shown in FIG. 25, the electronic ink fabric may include a plurality of electronic ink capsules 470 containing electronic ink, a first electrode 470a formed on one surface of the electronic ink capsule, a second electrode 470b formed on an opposite surface of the first electrode, and an insulator (not shown) provided between the first electrode and the second electrode. In addition, although not illustrated in the drawings, a protective layer covering the first electrode, the second electrode, and the insulator may be further included.

The electronic ink capsules may contain at least one of a red electronic ink reflecting red light, a green electronic ink reflecting green light, a blue electronic ink reflecting blue light, a black electronic ink that absorbs light, and a white electronic ink that reflects light. For example, the red electronic ink, the black electronic ink, and the white electronic ink may be contained in one capsule, the green electronic ink, the black electronic ink, and the white electronic ink may be contained in one capsule, and the blue electronic ink, the black electronic ink, and the white electronic ink may be contained in one capsule.

An inner electrode and an outer electrode may be transparent electrodes made of a transparent conductive material, and examples of the transparent conductive material may include ITO, IZO, aluminum-doped ZAO, AgNW, and the like.

The protective layer covering the first electrode, the second electrode, and the insulator may be formed by coating ordinary textile fibers or fibers in a mesh form. By using ordinary textile fibers as the protective layer, a texture of the ordinary textile fibers may be imparted to the electronic ink fiber. The first electrode and the second electrode may be connected to the driver 421 of the connection module 420, and the driver 421 may change the design of the smart garment 400 by applying a voltage to the first electrode and the second electrode according to the control signal of the processor 423.

The fabric of the smart garment 400 according to the present embodiment may be formed by color-changing fibers having a twisted structure of the electronic ink fibers and the ordinary textile fibers, as in the embodiment using the cholesteric liquid crystal fibers, or may be formed by weaving the electronic ink fibers and the ordinary textile fibers in the form of a net. In the case of the fabric woven with the color-changing fibers having the twisted structure of the electronic ink fibers and the ordinary textile fibers, the above-described first electrode and second electrode may not be formed on the electronic ink fiber, but the first electrode and the second electrode may be formed on one surface of the woven fabric and an opposite surface.

Since the electronic ink also has bistability like the above-described cholesteric liquid crystal, power required for changing a design of the smart garment 400 may be minimized.

FIG. 26 is a diagram illustrating an electrochromic fiber among color-changing fibers of the smart garment 400 according to the disclosed embodiment.

As shown in FIG. 26, the electrochromic fiber 480 may include a first electrode 482, a counter electrode 489 provided outside the first electrode, an electrolyte 487 provided outside the counter electrode, a working electrode 485 provided outside the electrolyte, a second electrode 483 provided outside the working electrode, and a protective layer 481 provided to cover the second electrode. In addition, although not illustrated in the drawings, a partition wall for maintaining a shape of the fiber may be provided inside the electrochromic fiber. In the present embodiment, since the first electrode will be referred to as an inner electrode since it is provided inside the fiber, and the second electrode will be referred to as an outer electrode.

The inner electrode and the outer electrode may be transparent electrodes made of a transparent conductive material to which a voltage is applied from the driver 421 of the connection module 420. Examples of the transparent conductive material may include ITO, IZO, aluminum-doped ZAO, AgNW, and the like.

The electrolyte may be a solid electrolyte or a liquid electrolyte, which is ionized and supplies a charge or ion to the inner electrode and the outer electrode when a voltage is applied thereto.

At least one of the working electrode and the counter electrode includes a color-changing material. For example, the working electrode may include a material that changes color as it is reduced, and the counter electrode may include a material that changes color as it is oxidized. Both the working electrode and the counter electrode may include the above-described color-changing material, or only one of the working and counter electrodes may include the above-described color-changing material while the other may include an ion-receiving electrode.

Typical reducing color-changing materials include WO3 and MoO3 TiO2, and oxidative color-changing materials include Ir(OH)x, Ni(OH)2, and Rh2O3. The electrochromic fiber may realize different red colors, green colors, and blue colors and combinations thereof in the color-changing material, and may be changed to a transparent state. The protective layer may be formed by coating ordinary textile fibers or fibers in a mesh form. By using ordinary textile fibers as the protective layer, a texture of the ordinary textile fiber may be imparted to the electrochromic fiber. The inner electrode and the outer electrode may be connected to the driver 421 of the connection module 420, and the driver 421 may change the design of the smart garment 400 by applying a voltage to the first electrode and the second electrode according to a control signal of the processor 423.

A fabric of the smart garment 400 according to the present embodiment may be formed by mixing electrochromic fibers and ordinary textile fibers, as in the embodiment using the cholesteric liquid crystal fabric. Since the electrochromic material also has bistability like the above-described cholesteric liquid crystal, power required for changing a design of the smart garment 400 may be minimized.

FIGS. 27A, 27B, 27C, 27D, and 27E are diagrams illustrating electroluminescent fibers among color-changing fibers of the smart garment 400 according to the disclosed embodiment.

The above-described cholesteric liquid crystal fibers, electronic ink fibers, and electrochromic fibers are reflective fibers, and electroluminescent fibers 490 shown in FIG. 27A are self-luminescent fibers. Thus, when a fabric of the smart garment 400 is formed using the electroluminescent fibers, the connection module 420 of the smart garment 400 includes the battery 429.

As shown in FIG. 27A, the electroluminescent fibers may include a first electrode 497, a luminescent material 495 provided outside the first electrode, a second electrode 493 provided outside the luminescent material, and a protective layer 491 covering the second electrode 493. Each of the electroluminescent fibers may use a luminescent material that emits red, green, or blue light, and fibers using these different luminescent materials may be woven together with ordinary textile fibers to form the fabric of the smart garment 400.

In the present embodiment, the first electrode will be referred to as an inner electrode since it is provided inside the fiber, and the second electrode will be referred to as an outer electrode.

In another embodiment, as shown in FIG. 27B, a material that emits white light is used as the luminescent material, and color filters 492a, 492b, and 492c, which transmit red light, green light, and blue light, respectively, may be attached to outer surfaces of the outer electrodes to form the electroluminescent fiber. At this time, as shown in FIG. 27B, the outer electrodes are spaced apart from each other, and the aforementioned color filters are attached respectively to the outer electrodes provided at a distance from each other. In this case, each of the outer electrodes may be individually controlled by the driver 421 of the connection module 420. A partition wall 496 for maintaining a shape of the fiber may be provided inside the luminescent material.

In still another embodiment, as shown in FIG. 27C, materials 495a, 495b, and 495c that emit red light, green light, and blue light, respectively, are used as the luminescent material, and an outer electrode is provided outside each of the materials to form the electroluminescent fiber. At this time, as shown in FIG. 27C, the outer electrodes may be spaced apart from each other, and may be individually controlled by the driver 421 of the connection module 420.

In yet another embodiment, as shown in FIG. 27D, a core of the electroluminescent fiber is formed by an organic textile fiber 494, and three inner electrodes spaced apart from each other are formed outside the textile fiber. In addition, materials 495a, 495b, and 495c, which emit red light, green light, and blue light, respectively, may be provided as luminescent materials formed outside of the inner electrodes, and outer electrodes may be provided respectively outside of the materials to form the electroluminescent fiber. In the present embodiment, inner and outer electrodes that apply voltages to different luminescent materials may be individually controlled by the driver 421 of the connection module 420.

The inner electrode and the outer electrode are transparent electrodes made of a transparent conductive material. Examples of the transparent conductive material may include ITO, IZO, aluminum-doped ZAO, AgNW, and the like. The inner electrode and the outer electrode may be formed in a planar shape or in a linear shape.

A protective layer may be formed by coating ordinary textile fibers or fibers in a mesh form. By using ordinary textile fibers as the protective layer, a texture of the ordinary textile fibers may be imparted to the electroluminescent fiber. As described above, the inner electrode and the outer electrode may be connected to the driver 421 of the connection module 420, and the driver 421 may change the design of the smart garment 400 by applying a voltage to the inner electrode and the outer electrode according to the control signal of the processor 423.

The fabric of the smart garment 400 according to the present embodiment may be formed by mixing the electrochromic fibers and the ordinary textile fibers, as in the embodiment using the cholesteric liquid crystal fibers.

What is claimed is:

1. A smart garment comprising:
   a first material comprising a first electrode and a second electrode;
   a second material comprising a third electrode and a fourth electrode; and a connection module comprising a first ground terminal configured to ground one of the first electrode and the second electrode in response to a signal transmitted by a user terminal, a first signal terminal applying a voltage to another one of the first electrode and the second electrode, a second ground terminal configured to ground one of the third electrode and the fourth electrode, and a second signal terminal applying a voltage to another one of the third electrode and the fourth electrode, wherein the first material and the second material comprises cholesteric liquid crystal fibers including a cholesteric liquid crystal, wherein the cholesteric liquid crystal comprises:
- a pixel including a red sub-cell configured to reflect red light, a green sub-cell configured to reflect green light, and a blue sub-cell configured to reflect blue light; and
- a grid provided to separate the red sub-cell, the green sub-cell, and the blue sub-cell, and formed from textile fibers, and wherein the pixel is provided so that the red sub-cell, the green sub-cell, and the blue sub-cell are formed to be coplanar or the red sub-cell, the green sub-cell, and the blue sub-cell are formed to have a stacked structure.

2. The smart garment of claim 1, wherein each of the cholesteric liquid crystal fibers further comprises a first cholesteric liquid crystal fiber electrode provided at one side of the cholesteric liquid crystal, a second cholesteric liquid crystal fiber electrode provided at a side opposite the first cholesteric liquid crystal fiber electrode, an insulator provided between the first cholesteric liquid crystal fiber electrode and the second cholesteric liquid crystal fiber electrode, and a protective layer provided to cover the first cholesteric liquid crystal fiber electrode, the second cholesteric liquid crystal fiber electrode, and the insulator.

3. The smart garment of claim 2, further comprising a connection portion provided to connect the cholesteric liquid crystal fibers so as to extend the cholesteric liquid crystal fibers, and wherein the connection portion comprises a first connection electrode provided to connect the first cholesteric liquid crystal fiber electrodes of the cholesteric liquid crystal fibers, a second connection electrode provided to connect the second cholesteric liquid crystal fiber electrodes of the cholesteric liquid crystal fibers, and an insulator provided between the first connection electrode and the second connection electrode.

4. The smart garment of claim 2, the cholesteric liquid crystal comprises a partition wall provided to maintain a shape of the cholesteric liquid crystal fibers.

* * * * *